United States Patent
Hiraki et al.

[11] Patent Number: 5,988,610
[45] Date of Patent: Nov. 23, 1999

[54] LIQUID SEALED SUSPENSION UNIT

[75] Inventors: Hikosaburo Hiraki; Kuniaki Nakada, both of Kanagawa-ken; Mituo Kuzukawa; Tatuo Tanaka, both of Saitama-ken, all of Japan

[73] Assignees: Komatsu, Ltd., Tokyo; Fukoku Co., Ltd., Saitama-ken, both of Japan

[21] Appl. No.: 08/836,233

[22] PCT Filed: Nov. 7, 1995

[86] PCT No.: PCT/JP95/02275

§ 371 Date: Apr. 29, 1997

§ 102(e) Date: Apr. 29, 1997

[87] PCT Pub. No.: WO96/14520

PCT Pub. Date: May 17, 1996

[30] Foreign Application Priority Data

Nov. 7, 1994 [JP] Japan ..................... 6-272458

[51] Int. Cl.⁶ ............... F16F 13/00; F16F 9/32; B62D 27/04
[52] U.S. Cl. ............... 267/140.13; 267/141.1; 267/141.4
[58] Field of Search ............. 267/140.11, 140.13, 267/141.1–141.7

[56] References Cited

U.S. PATENT DOCUMENTS

| | | | |
|---|---|---|---|
| 2,069,270 | 2/1937 | Piron | 267/141.1 |
| 2,538,380 | 1/1951 | Pflager | 267/141.1 |
| 2,683,016 | 7/1954 | Campbell | 267/140.11 |
| 2,917,265 | 12/1959 | Markowski | 267/140.11 |
| 2,942,834 | 6/1960 | Clark | 267/140.11 |
| 2,982,536 | 5/1961 | Kordes | 267/153 |
| 4,349,184 | 9/1982 | Peterson et al. | 267/141.7 |
| 4,399,987 | 8/1983 | Cucellin et al. | |
| 4,630,807 | 12/1986 | Gaudiau | 267/35 |
| 4,793,599 | 12/1988 | Ishioka | 188/320 |
| 4,852,533 | 8/1989 | Doncker et al. | |
| 5,409,199 | 4/1995 | Kahmann | 267/153 |
| 5,449,152 | 9/1995 | Byrnes et al. | 267/153 |

FOREIGN PATENT DOCUMENTS

| | | |
|---|---|---|
| 56-36519 | 4/1981 | Japan . |
| 62-380 | 1/1987 | Japan . |
| 63-135627 | 6/1988 | Japan . |

*Primary Examiner*—Chris Schwartz
*Attorney, Agent, or Firm*—Frishauf, Holtz, Goodman, Langer & Chick, P.C.

[57] ABSTRACT

A liquid sealed suspension unit includes a first member and a second member which are independent of each other and which are coupled together. A cylindrical rubber mount (43) is fastened to the first member, and the second member is mounted so as to be slidable in an axial direction thereof relative to the cylindrical rubber mount (43). The cylindrical rubber mount (43) has a plurality of rubber layers (46a, 46b, 46c) laminated via a plurality of cylindrical members (45a, 45b, 45c) such that they are different with respect to at least either of (i) thickness in their radial direction and (ii) height in their axial direction. A spring member (57), in the form of at least one spring coil, is interposed between a damper plate member (50) and an inner surface of a vessel (40) at the bottom of the vessel. This construction provides an increased displacement amplitude in the axial direction, and an excellent vibration absorptivity for both a roll and a pitch can be achieved.

31 Claims, 20 Drawing Sheets

LIQUID SEALED SUSPENSION UNIT

TECHNICAL FIELD

The present invention relates to a liquid sealed type suspension unit and, more particularly, to a liquid sealed suspension unit that may be used in mounting a cab upon a body of an automobile such as an industrial vehicle to effectuate its vibration absorption ability.

BACKGROUND ART

FIG. 1 of the drawings attached hereto shows the entire construction of a part whereby a cab is mounted on a dump truck. A dump truck 1 has a frame 2 to which are fastened a pair of brackets 3 and 4 for supporting a floor 6 of a cab 5 via a pair of liquid sealed suspension units 10 and 10. A said liquid sealed suspension unit 10 is effective to prevent vibrations from a road and so forth from being transmitted directly to the said cab 5.

FIG. 2 is a detailed view of a portion II of FIG. 1. To the said bracket 4 there is fastened a casing 11 of the said liquid sealed suspension unit 10 by means of a bolt 12 and a nut 13. The said liquid sealed suspension unit 10 has a guide shaft 14 that is fastened to the said floor 6 by means of a nut (or bolt) 15. Thus, the said cab 5 in a state in which vibrations may be absorbed by means of the said liquid sealed suspension 10 is mounted on the said bracket 4.

As a said liquid sealed suspension unit 10 of this sort which effectuates a vibration absorption requirement there have hitherto be known what are shown in FIGS. 3 and 4.

In what is shown in FIG. 3, the said guide shaft 14 having a bolt 16 is coupled to the said casing 11 via a cylindrical rubber mount 17. The said casing 11 has one end fastened to a vessel 20, that is formed therein with a liquid sealed chamber 29 in which a damping liquid 21 is sealed. The said liquid sealed chamber 29 contains a damper plate member 23 with a rubber stopper 24, which is fastened to the downward end of the said guide shaft 14 by means of a bolt 22. The said damper plate member 23 is formed with a bore 25 whereas the said vessel 20 is formed with an inlet port 26.

The said damping liquid 21 is injected or poured into the said liquid sealed chamber 29 through the inlet port 26 of the said vessel 20, and the bore 25 in the said damper plate member 23 is used to inject or pour the said damping liquid 21 into an upper cavity of the said damper plate member 23.

And, if a vertical (axial) vibratory load is applied to the said guide shaft 14, the said damper plate member 23 acts to agitate the damping liquid 21 so that the vibrations may be damped with a damping force that is then generated.

Also, in what is shown in FIG. 4, a casing 30 is coupled with a guide shaft 31 having a bolt 16 via a cylindrical rubber mount 33 that consists of cylindrical rubber sections of an identical thickness laminated with intervening cylindrical plate members 32. The said guide shaft 31 has a whirl-stop pin 34 that is effective, when the said bolt 16 is fastened, to prevent the said guide shaft 31 itself from being turned. A downward end of the said casing 30 and a stopper plate 36 has fastened thereto a vessel 35 in which a said liquid sealed chamber 29 containing a said damping liquid 21 is formed. The said liquid sealed chamber 29 also contains a said damper plate member 23 fastened to the downward end of the said guide shaft 31 by means of a said bolt 22 as well as the said stopper plate 36. The said damper plate member 23 has a rubber stopper 37 fastened to its upper surface and a foamed elastic body 38 securely sandwiched between its lower surface and a plate 39.

Of the above mentioned constructions which have been adopted in the prior art, what is shown in FIG. 3 has the problem that the said damper plate 23, due to its circular configuration, has only been effective to generate a damping force in its axial direction. However, the said rubber mount 17 which is designed to produce a vibration absorbing action both in its axial and transverse directions has, due to its transverse rubber stiffness that is lower than its vertical rubber stiffness because of its unitary structure with a large thickness, allows vibrations with a complicated orientation to be set free in the transverse direction, and hence a cause to generate a rolling from side to side.

On the other hand, what is shown in FIG. 4 and has been adopted also in the prior art is characterized by a construction in which the said rubber mount 33, due to its laminated structure, has had its transverse spring constant that is higher than that in what is shown in FIG. 3 and its axial spring constant that is reasonably high as well. However, with such a construction, the displacement component attainable in the axial direction, rather than the radial rubber distortion constant related to the rubber durability, remains within the order of ±6 mm and cannot be largely taken. Therefore, this has the problem that a vehicle therewith is not comfortable to ride in and its vibration absorptivity is thus poor in spite of the fact that there may not be a roll due to a transverse vibratory component since the transverse spring constant is large (stiffness is high) because of a laminated structure of rubber sections which are of an identical thickness.

The present invention has taken account of the above mentioned problems in the prior art and has for its object to provide a liquid sealed suspension unit whereby a vehicle therewith becomes comfortable to ride in owing to the fact that an increased vibratory amplitude can be taken in the axial direction and the rubber durability that is related to the said increased vibratory amplitude and hence the damping effect can be markedly enhanced, and an excellent vibration absorbing effect as a whole can be obtained owing to the fact that there can be no roll due to vibrations in complicated directions because of both the transverse damping action and the small amplitude vibration absorbing action which can be enhanced.

SUMMARY OF THE INVENTION

In order to achieve the object mentioned above, there is provided in accordance with the present invention, in a first general form of embodiment thereof, a liquid sealed suspension unit in which: a first member and a second member which are independent of each other are coupled together via a cylindrical rubber mount; and a damping liquid is sealed in, and a damper plate member that is provided at one end of the said second member is contained within, a liquid sealed chamber formed in a vessel that is fastened to the said first member, characterized in that:

the said cylindrical rubber mount is fastened to the said first member whereas the said second member is fitted so as to be slidable in an axial direction thereof relative to the said rubber mount; the said cylindrical rubber mount is constituted by a plurality of cylindrical rubber layers laminated via a plurality of cylindrical members so that they may be different with respect to at least either of thickness in their radial direction and height in their axial direction; and a spring member comprised of at least one spring coil is interposed between the said damper plate member and an inner surface of the said vessel at its bottom.

According to the construction mentioned above, it can be seen that when relative to the said first member the said second member is vibrated in its axial direction towards the said liquid sealed chamber, the vibrations of the said second member will be resiliently supported by the said spring member comprised of the said at least one coil spring.

Also, when relative to the said first member the said second member is transversely vibrated, it can be seen that the said transverse vibrations will be resiliently supported by an elastic force of the said laminated rubber layers inside of the said rubber mount and, if the said transverse vibrations are large, will be resiliently supported as the said rubber mount as a whole is deformed in its radial direction.

And, according to this construction, it can be seen that since the axial support is performed with the said spring member comprised of the said at least one spring coil, an increased vibratory amplitude will be obtained in the axial direction. Also, by permitting the transverse support to be performed with the said cylindrical rubber mount that is constituted by the said plurality of cylindrical rubber layers which are different with respect to the thickness in their radial direction and the height in their axial direction, it can be seen that since for such a transverse force a small amplitude vibration can be met with a low spring constant (i. e. with a soft spring property) and a large amplitude vibration can be met with a high spring constant (i. e. with a hard spring property), absorbing the transverse vibrations and preventing a rolling from side to side will both be achieved.

Also, in the said cylindrical rubber mount, the cylindrical rubber layers in the said radial direction may be different in hardness.

According to this arrangement, by, for example, rendering a said cylindrical rubber layer inner in the said radial direction of a lowered hardness and a said cylindrical rubber layer outer in the said radial direction of a higher hardness, it can be seen that absorbing transverse vibrations in a small amplitude range and preventing a roll from side to side in a large amplitude range will both be achieved.

Also, in the said cylindrical rubber mount, at least one of the said cylindrical rubber layers has a cross sectional configuration in which its outer side is higher than its inner side in the said axial direction.

According to this construction, it can be seen that the transverse spring property will be rendered non-linear and smoothly solid.

More specifically, since for transverse vibrations a small amplitude vibration can be met with a soft spring property and a large amplitude vibration can be met with hard spring property, it can be seen that absorbing the transverse vibrations smoothly and preventing a roll from side to side will both be achieved.

Further, a said cylindrical member that is located at the inner side of the said cylindrical rubber mount may have a height that is equal to such height that a member that is coupled to the other side of the said second member, makes a contact with the upper end of the said cylindrical member when the said second member is displaced towards the bottom inner surface of the said vessel.

According to this construction, it can be seen that since a load that is applied after the upper end of the said cylindrical member makes a contact with the said second member can be supported by a force of deformation in a shearing direction of the said rubber mount as well as the said spring member and any vibration can then be supported resiliently by both the laminated rubber layers of the said rubber mount and the said at least one coil spring, the absorptivity for a large amplitude vibration and the strength of vibration absorption will both be enhanced.

Further, there may be provided a roll preventing stopper at outside of a sleeve which retains a bearing that is fitted so as to be axially slidable relative to the said second member and to which the said cylindrical rubber mount is fastened so that the said roll preventing stopper may be bought into a loosely fitting state with an inner circumferential surface of a said inner cylindrical member therein that is opposing to the said sleeve substantially across an inner side rubber layer.

According to this construction, it will be seen that with the said roll preventing stopper coming into contact with the said inner circumferential surface of a said inner cylindrical member, an excessive roll from side to side can be prevented.

Further, there may be provided a shield member for covering an upper portion of the said cylindrical rubber mount and a sliding portion between the said cylindrical rubber mount and the said second member from an above side.

According to this construction, it will be seen that since at least the upper part of the said cylindrical rubber layers of the said cylindrical rubber mount and the said sliding portion as a whole is shielded from the outside, the intrusion of foreign matters such as earth and sand, dust and water into these parts and portions can be prevented.

In order to achieve the object mentioned above, there is also provided in accordance with the present invention, in a second general form of embodiment thereof, a liquid sealed suspension unit in which: a first member and a second member which are independent of each other are coupled together via a cylindrical rubber mount; and a damping liquid is sealed in, and a damper plate member that is provided at one end of the said second member is contained within, a liquid sealed chamber formed in a vessel that is fastened to the said first member, characterized in that:

the said cylindrical rubber mount is fastened to the said first member whereas the said second member is fitted so as to be slidable in an axial direction thereof relative to the said rubber mount; the said cylindrical rubber mount is constituted by a plurality of cylindrical rubber layers laminated via a plurality of cylindrical members so that they may be different with respect to at least either of thickness in their radial direction and height in their axial direction; a damper receiving member is contained in the said liquid sealed chamber so as to be slidable along an inner surface of the said vessel at its bottom whereas the said damper receiving member and the said damper plate member are fitted with each other so as to be slidable in an axial direction relative to each other; and a spring member comprised of at least one spring coil is interposed between the said damper receiving member and the said damper plate member.

According to this construction, it can be seen that when an impact force of a large amplitude in the transverse direction is acting, the said damper plate member and the said damper receiving member will be caused to slide with each other along a bottom inner surface of the said vessel and a sliding frictional force that is then generated acts to effectively damp the above mentioned large impact force.

And, one of the said damper plate member and the said damper receiving member may be formed with a guide bore and the other of the said damper plate member and the said damper receiving member may be provided with a guide rod which is slidably fitted in the said guide bore with a diametrical interstice between them such that the said damping liquid can freely be passed therethrough.

According to this construction, it can be seen that since an interstice is formed at an interface at which the said guide bore and the said guide rod are fitted with each other and, when the said damp plate member is sliding in its axial direction, the said damping liquid introduced into the said guide bore is allowed to flow freely through the said interstice, and any damping resistance by the said damping liquid will be eliminated.

Moreover, according to this construction, when a transverse force is acting to vibrate the said guide shaft transversely with a small amplitude that corresponds to a backlash between the said guide bore and the said guide rod, it can be seen that the said damper receiving member will not be displaced transversely. Also, when a force of a large amplitude that exceeds the said backlash is acting, it can be seen that the said damper receiving member will be displaced transversely to generate between the said damper receiving member and the said vessel a sliding frictional force with which a frictional damping force is acting whereby a large damping force will be developed.

Accordingly, this will enable a vehicle to be comfortable to ride in where a high frequency vibration with a small transverse amplitude develops as in the case in which the vehicle is traveling for the purpose of leveling the land for construction as on the graveled ground.

Also, one of the said damper plate member and the said damper receiving member may be formed with a guide bore whereas the other of the said damper plate member and the said damper receiving member may be provided with a guide rod which is slidably fitted without a backlash in the said guide bore; one of the said guide bore and the said guide rod may have a cross sectional configuration which is different from that of the other of them so that an interstice may be formed between an inner surface of said the guide bore and an outer surface of the said guide rod such that the said damping liquid can freely be passed therethrough.

According to this construction, it can be seen that when a transverse force is acting, then since the said damper plate member and the damper receiving member as a whole are vibrated transversely, a good response will be obtainable to enable the vehicle to be comfortable to ride in when traveling on a not so much heavily bad land.

Further, the said damping plate member has its peripheral surface which is formed with a downward tapered surface and an upward tapered surface; the said downward tapered surface is opposing to an inner surface of the said vessel; and the said upward tapered surface is opposing to an inner surface of a stopper member disposed above the said vessel.

According to this construction, for the vertical vibrations of the said damper plate member it is possible to generate a small damping force if the amplitude is small and to generate a large damping force if the amplitude is large.

Further, said spring member may comprise a plurality of coil springs.

According to this construction, it is possible to set up the spring property to be rigid in the load range of a mounting load, and to be soft in the load range of a vibration absorbing region that exceeds this mounting load. It is also possible to reduce the amount of displacement in accordance with a difference between mounting loads to reduce a deviation of the said amount of displacement while maintaining an excellent vibration absorptivity.

Further, if the said damping liquid may comprise a silicone oil having incorporated therein an additive agent with a lubricity, such as nylon (trade name), polyacetal or polystyrene, the wear of constituent members of the present liquid sealed suspension unit by the damping liquid that is vibrated by the vibrations of the said damper plate member can be substantially reduced.

In order to achieve the object mentioned previously, there is also provided in accordance with the present invention, in a third general form of embodiment thereof, a liquid sealed suspension unit in which: a first member and a second member which are independent of each other are coupled together via a cylindrical rubber mount; and a damping liquid is sealed in, and a damper plate member that is provided between one end of the said second member and an inner surface of a vessel at its bottom is contained within, a liquid sealed chamber formed in the said vessel that is fastened to the said first member, characterized in that:

the said cylindrical rubber mount is fastened to the said first member whereas the said second member is fitted so as to be slidable in an axial direction thereof relative to the said rubber mount; the said cylindrical rubber mount is constituted by a plurality of cylindrical rubber layers laminated via a plurality of cylindrical members so that they may be different with respect to at least either of thickness in their radial direction and height in their axial direction; a damper receiving member is contained in the said liquid sealed chamber so as to be slidable along the bottom inner surface of the said vessel; the said damper receiving member and the said damper plate member are fitted with each other so as to be slidable relative to each other in an axial direction; a stopper is provided in the said vessel for regulating a displacement of the said damper plate member towards a side of the said second member; and a first and a second spring coil constituting a spring member are interposed between the said damper receiving member and the said damper plate member and between the said damper plate member and the said second member, respectively, so that in a state in which the said damper plate member does not make a contact with the said stopper, both of the said first and second coil springs may be effective and that in a state in which the said damper plate member makes a contact with the said stopper, only the said second spring may be effective.

In order to achieve the object mentioned previously, there is also provided in accordance with the present invention, in a fourth general form of embodiment thereof, a liquid sealed suspension unit in which: a first member and a second member which are independent of each other are coupled together via a cylindrical rubber mount; and a damping liquid is sealed in, and a damper plate member that is provided at one end of the said second member is contained within, a liquid sealed chamber formed in a vessel that is fastened to said first member, characterized in that:

the said cylindrical rubber mount is fastened to the said first member whereas the said second member is fitted so as to be slidable in an axial direction thereof relative to the said rubber mount; the said cylindrical rubber mount is constituted by a plurality of cylindrical rubber layers laminated via a plurality of cylindrical members so that they may be different with respect to at least either of thickness in their radial direction and height in their axial direction; a damper receiving member is contained in the said liquid sealed chamber so as to be slidable along a bottom inner surface of the said vessel; and a first and a second spring coil constituting a spring member are interposed between the said damper receiving member and the said damper plate member and between the said damper plate member and the said second member, respectively.

According to the above mentioned third and fourth general forms of embodiment of the present invention, it is possible to set up the spring property to be rigid in the load range of a mounting load and to be soft in the load range of a vibration absorbing region that exceeds the said mounting load. Since an increase in the amount of displacement due to a difference between mounting loads that occurs when the spring property is softened in order to enhance the vibration absorptivity is therefore not produced in the load range of a cab mounting region, it will be seen that a deviation in the said amount of displacement with a plurality of liquid sealed suspension units in the said load range can be reduced. Thus, a deviation in the amount of displacement due to a difference between mounting loads that is created when the spring property is softened in order to enhance an excellent vibration absorptivity can be reduced.

BRIEF EXPLANATION OF THE DRAWINGS

The present invention will better be understood from the following detailed description and the drawings attached hereto showing certain illustrative embodiments of the present invention. In this connection, it should be noted that such embodiments as illustrated in the accompanying drawings are intended in no way to limit the present invention, but to facilitate an explanation and an understanding thereof.

In the accompanying drawings.

BEST MODES FOR CARRYING OUT THE INVENTION

Figure 1:
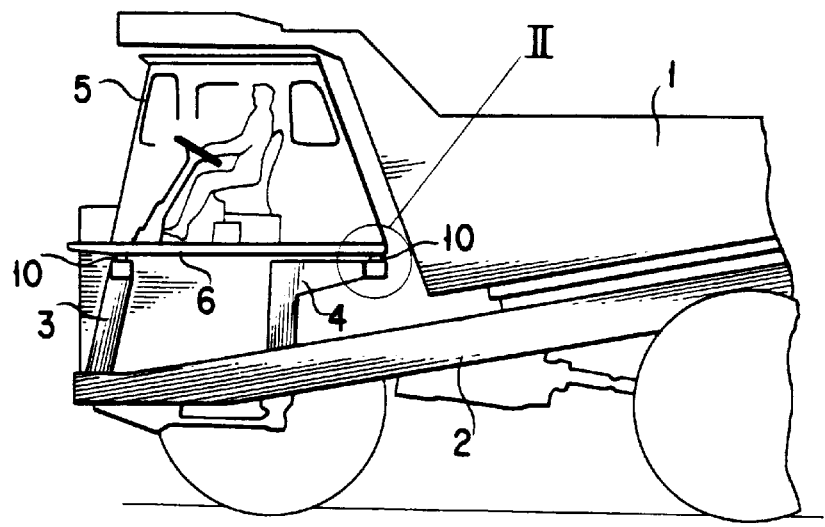
FIG. 1 is the entire constructive view of a cab mounting portion in a dump truck.
Figure 2:
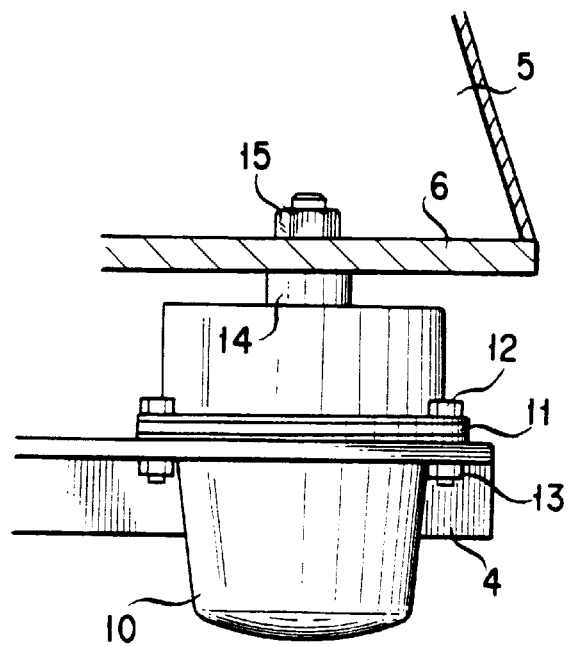
FIG. 2 is a detailed view of a portion II in FIG. 1.
Figure 3:
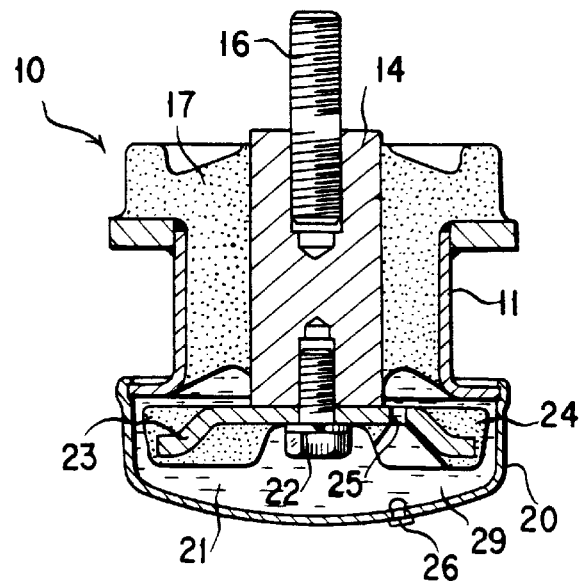
FIG. 3 is a cross sectional view of an example in the prior art.
Figure 4:
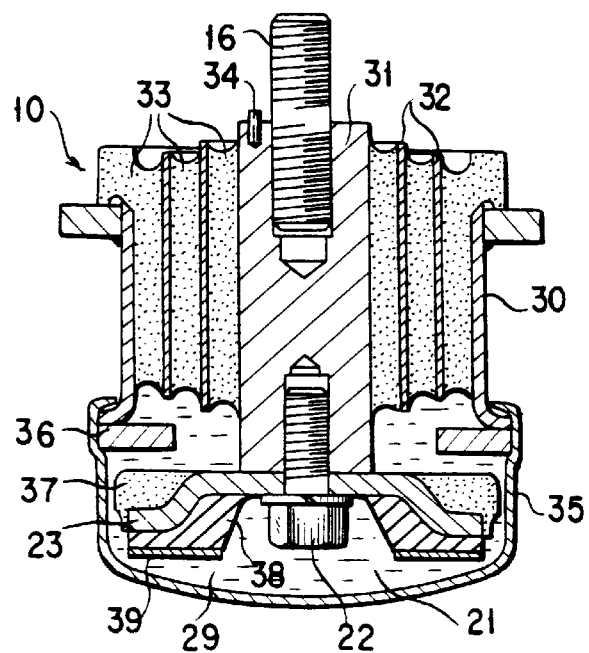
FIG. 4 is a cross sectional view of another example in the prior art.

Hereinafter, suitable embodiments of the present invention with respect to a liquid sealed suspension unit will be set forth with reference to the accompanying drawings hereof.

Firstly, an explanation will be given of a first embodiment of the liquid sealed suspension unit according to the present invention with reference to FIGS. 5 to 7.

A liquid sealed chamber 80 is configured as a space that is defined by a truncated conical vessel 40, a cylindrical rubber mount 43 and a rubber stopper 59. Various members for defining the said liquid sealed chamber 80 are fastened to one another so as to be mutually integral. Inside of the said liquid sealed chamber 80 a damping liquid 60 as well as a spring member 57 comprised of a coil spring and a damper plate member 50 that is integral with a guide shaft 42, is sealed. The said guide shaft 42 is fitted so as to be axially slidable relative to the said cylindrical rubber mount 43.

The said cylindrical rubber mount 43 is disposed outside of a sleeve 44 that retains a bearing 70 in which the said guide shaft 42 is slidably fitted, and is constituted by a plurality of cylindrical rubber layers 46a, 46b, 46c and 46d laminated coaxially and circularly via a plurality of cylindrical members 45a, 45b and 45c. The said laminated cylindrical rubber layers 46a, 46b, 46c and 46d are here different with respect to thickness in their radial direction and height in their axial direction. In their radial direction, their innermost layer 46a is the thickest and their outermost layer 46c is the thinnest so that they may be progressively thickened towards their inside. In their axial direction, an inner of them is progressively lower than an outer of them.

The above mentioned laminated cylindrical rubber layers 46a, 46b, 46c and 46d are also adjusted with respect to their hardness so that one located outer may be harder than one located inner and that they may be progressively hardened towards their outer side.

The said cylindrical rubber mount 43, together with a base plate 47 provided with a rubber stopper 59, is fastened via the said cylindrical member 45c that is located at the outermost position to a flange portion 41 of the said vessel 40 by caulking or the like.

The said damper plate member 50, that is here cylindrical, is disposed in an area in which the said guide shaft 42 confronts with the said liquid sealed chamber 80. And, the said cylindrical damper plate member 50 is formed around its axis with a cylindrical recess of which the inside serves to receive the said spring member 57, thus constituting a spring reception portion 52. Also, the peripheral surface of the said damper plate member 50 is formed on its lower side with a downwards tapered surface 53 having the diameter progressively reduced downwards and on its upper side with an upwards tapered surface 54 having the diameter progressively reduced upwards.

To the bottom surface of the said vessel 40 is fastened a spring reception member 74 and between the latter and the said damper plate member 50 is interposed the said spring member 57 comprised of the coil spring, as shown.

On the other hand, the said rubber stopper 59, that is here again cylindrical and is formed with a tapered recess 59a, is disposed at the lower side of the said base plate 47 beneath the above mentioned cylindrical rubber mount 43. The said rubber stopper 59 is so tapered that when the said damper plate 50 is moved upwards by a predetermined distance or more, its upward tapered surface 54 may contact with the inner surface of the said recess 59a and may then no longer move upwards.

The said damping liquid 60 is injected or poured through an inlet port (not shown) into the space within the above mentioned liquid sealed chamber 80 and is sealed therein. At this point it should be noted that between the said guide shaft 42 and the said bearing 70 there are provided seal members such as an O-ring 71 and a dust seal 72. The said bearing 70 is composed of bearing units 70a and 70b into which it is divided in its axial direction, the said bearing units 70a and 70b being tightly contacted with each other to mutually close any interstice in their axial direction.

Further, a liquid sealed suspension unit A as constructed as above to constitute a first embodiment of the present invention has a construction in which the said guide shaft 42 having a whirl-stop pin 73 is fastened by a bolt 81 to an attachment bracket 48 on the side of mounting members such as a cab whereas the said flange portion 41 of the vessel 40 in which the said damping liquid 60 is sealed is supported on a bracket 61 on the main frame side.

In the construction mentioned above, the mounted member such as the cab is supported on the main frame side via the said liquid sealed suspension unit A.

And, if the mounted member is then stationary, its weight will act as an initial load on the said liquid sealed suspension unit A. This state is the state shown in FIG. 5. The vertical load that is then produced have been supported by the said spring member 57 comprised of the coil spring.

Then, when the said mounted member is vertically vibrated, the said guide shaft 42 will be caused to reciprocate in its axial direction, and the vertical load that then develops will be supported resiliently by the said spring member 57 whereas the resistance that develops when the said damper plate member 50 that is integral with the said guide shaft 42 is reciprocated within the said damping liquid 60, will act as a damping force.

The damping force that is then produced by the reciprocating movement of the said damper plate member 50 within the said damping liquid will depend upon the flow path length $L_1$ and the flow path spacing $H_1$ between the downward tapered surface 53 of the said damper plate member 50 and a portion opposing thereto and the flow path length $L_2$ and the flow path spacing $H_2$ between the upwards tapered surface 54 of the said damping plate member 50 and a portion opposing thereto.

Figure 7A:
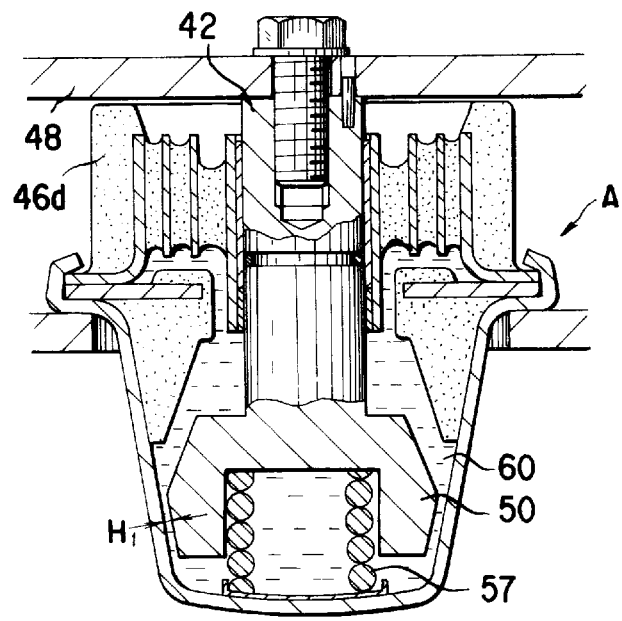
FIGS. 7A and 7B are each a cross sectional view showing the state in which an axial load is acting in the above mentioned first embodiment of the present invention.
Figure 7B:
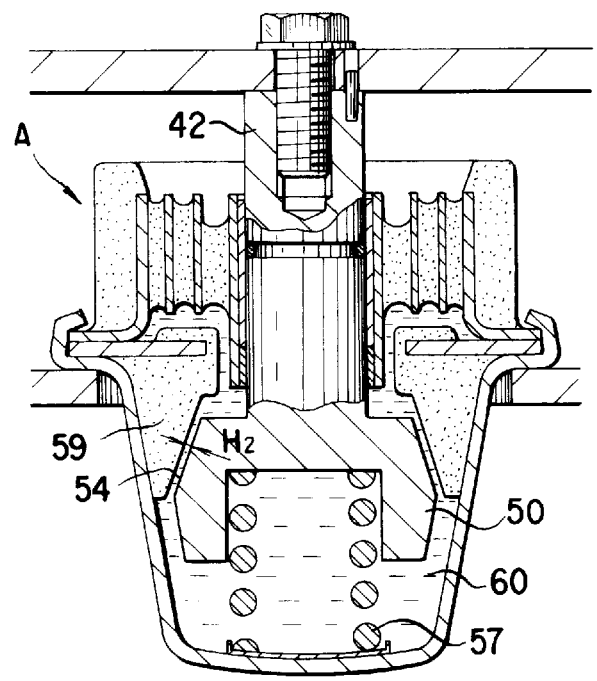

By means of the respective tapered surfaces 53 and 54 of the said damper plate member 50, a small damping force will develop for a small vibration amplitude due to the above mentioned flow path spacings $H_1$ and $H_2$ which are large and an increased damping force will develop for an increased vibration amplitude due to the above mentioned flow path spacings $H_1$ and $H_2$ which are reduced. FIG. 7A shows an operating state when the said damper plate member 50 is moved downward (with the retracted part of a vibration) and FIG. 7B shows an operating state when the said damper plate member 50 is moved upwards (with the extended part of a vibration), each in the present embodiment of the invention. It can be seen, however, that both of them show reduced flow path spacings $H_1$ and $H_2$ as the vibration amplitude is increased as compared with the case of FIG. 5 in which the case of a small vibration amplitude is shown. When the said damper plate member 50 is moved downwards as shown in FIG. 7A, the lower surface of the said attachment bracket 48 on the side of the said mounted member will contact with the upper surface of the laminated rubber layer 46d that is located at the outermost side of the said rubber mount 43, and will thus act as a stopper, thereby bringing about a stroke end. Conversely, when the said damper plate member 50 is moved upwards as shown in FIG. 7B, the upwards tapered surface 54 of the said damper plate member 50 will contact with the said rubber stopper 59 and will thus act as a stopper, thereby bringing about another stroke end.

Also, when the said mounted body is transversely vibrated, the said guide shaft 42 will be resiliently supported by the said rubber mount 43 that is fastened to the said sleeve 44, via the said bearing 70 fitted therewith and the said sleeve 44 for retention thereof. With the said rubber mount 43 constructed in a laminated structure and being structurally softened towards its inside, the spring characteristic thereof will then exhibit a property that it becomes hardened (the spring constant increased) as the vibration amplitude is enlarged.

Figure 6:
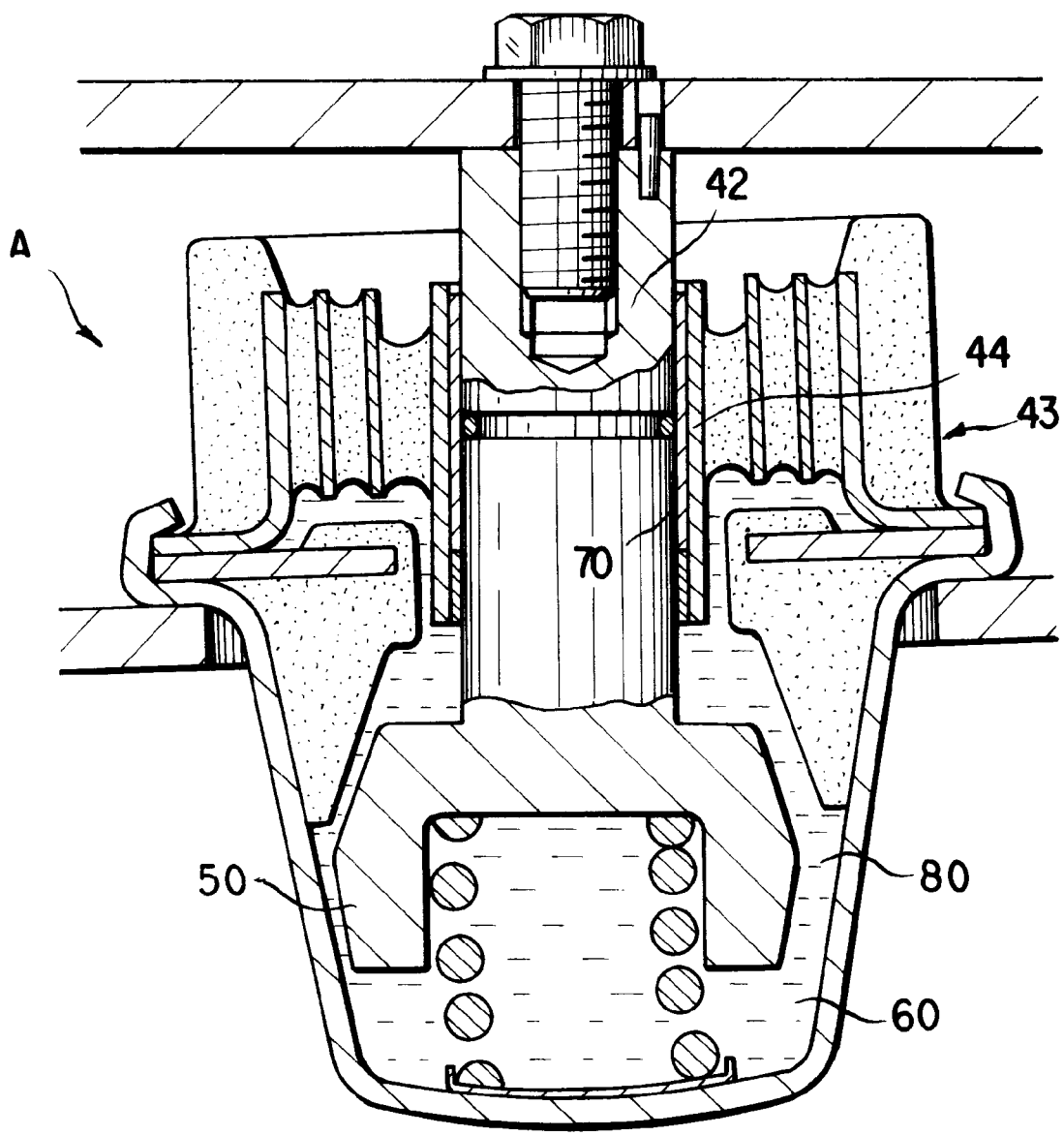
FIG. 6 is a cross sectional view showing the state in which a transverse load is acting in the above mentioned first embodiment of the present invention.

Further, when a rolling from side to side with a large amplitude is developed, it should be noted as shown in FIG. 6 that the said guide shaft 42 will be largely inclined to displace the said damper plate member 50 while thrusting aside the said damping liquid 60 within the said liquid sealed chamber 80. Then, the said rolling will be damped by the fluid resistance that is thereby produced.

Next, with reference to FIGS. 8A to 12, an explanation will be given of a second embodiment of the liquid sealed suspension unit according to the present invention.

Figure 8A:
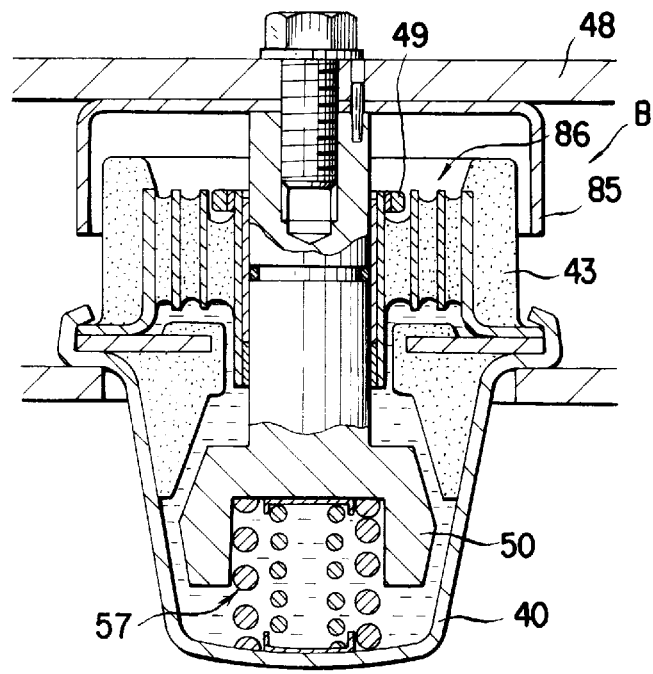
FIG. 8A is a cross sectional view of a second embodiment of the liquid sealed suspension unit according to the present invention.

Compared with the first embodiment previously set forth, the the liquid sealed suspension unit B shown in FIG. 8A additionally includes a cover plate 85 and a roll preventing stopper 49 and employs between the said damper plate member 50 and the said the inner bottom surface of the said vessel 40 a said spring member 57 which is here comprised of a plurality of coil springs.

FIG. 8A shows a state where the mounted member is stationary and its weight will act as an initial load on the liquid sealed suspension unit B.

Figure 8B:
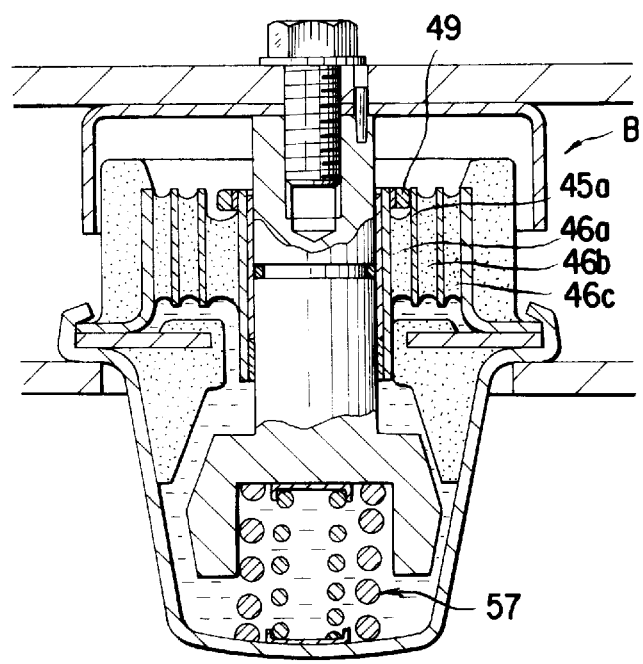
FIG. 8B is a cross sectional view showing the state in which a transverse load is acting in the above mentioned second embodiment of the present invention.

The said cover plate 85 serves to prevent dust, earth and sand, mud and so forth that may be piled upon a recess 86 above the said cylindrical rubber mount 43 from being intruded through interstices of the latter. On the other hand, the said roll preventing stopper 49, as shown in FIG. 8B, is designed to contact with the innermost cylindrical member 45a, when the innermost, soft rubber layer 46a is deformed by a large roll from side to side of the mounted member to an extent that exceeds a small amplitude which is effective to absorb vibrations, to prevent such an excessive roll, and to serve to perform a stopper function by permitting the said mounted body to be resiliently supported by the intermediate and outer laminated rubber layers 46b and 46c which are higher in rubber hardness than the inner rubber layer 46a.

FIGS. 9 to 12 show a first to a fourth example of a cover plate member 85 in this second embodiment of the present invention. The first example of the cover plate member shown in FIG. 9 has a skirt member 86 fastened to its hem in such a manner that its lower end may come into an intimate contact with the outer surface of the said rubber mount 43 so as to be slidable therewith. With the said lower end of the skirt member 86, the upper part of the said cylindrical rubber mount 43 is shielded.

Figure 10:
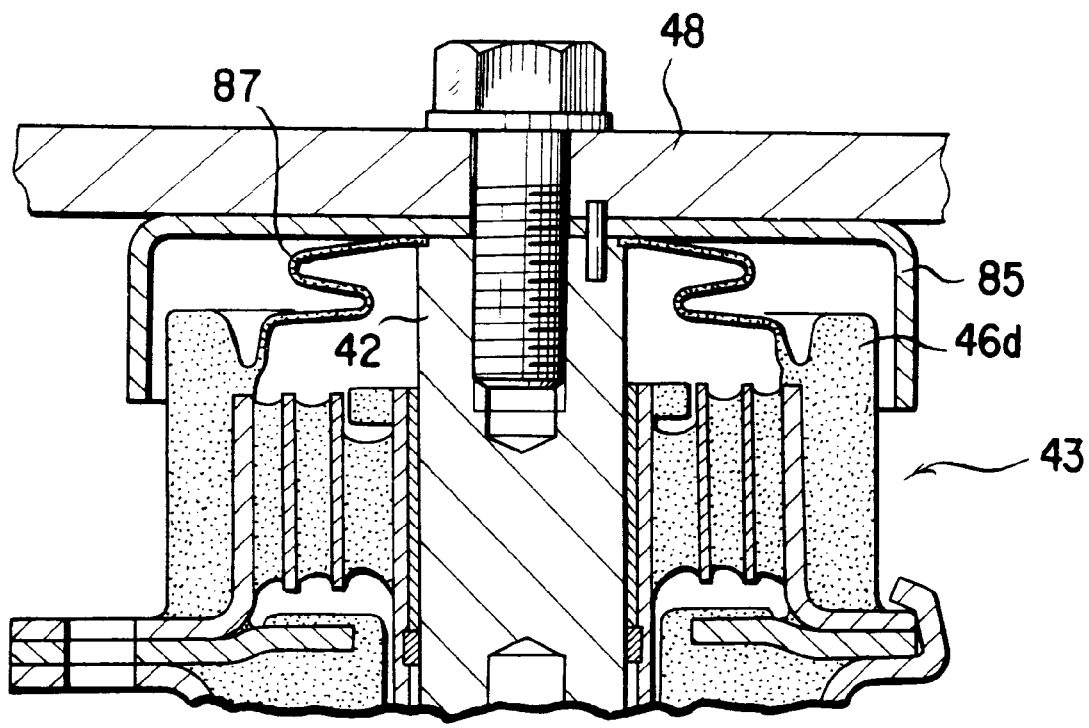
FIG. 10 is a partial cross sectional view showing a second example of a shielding member for covering the upper part of a cylindrical rubber mount in the above mentioned second embodiment of the present invention.

In the second example shown in FIG. 10, a bellows rubber member 87 is disposed above an inner portion of the said cylindrical rubber mount 43 and is integrally formed with the latter and with the outermost 46d of the laminated cylindrical rubber layers, and its upper end is attached to the inner central portion of a cover plate member 85 for covering the upper part of the cylindrical rubber mount 43.

Figure 11:
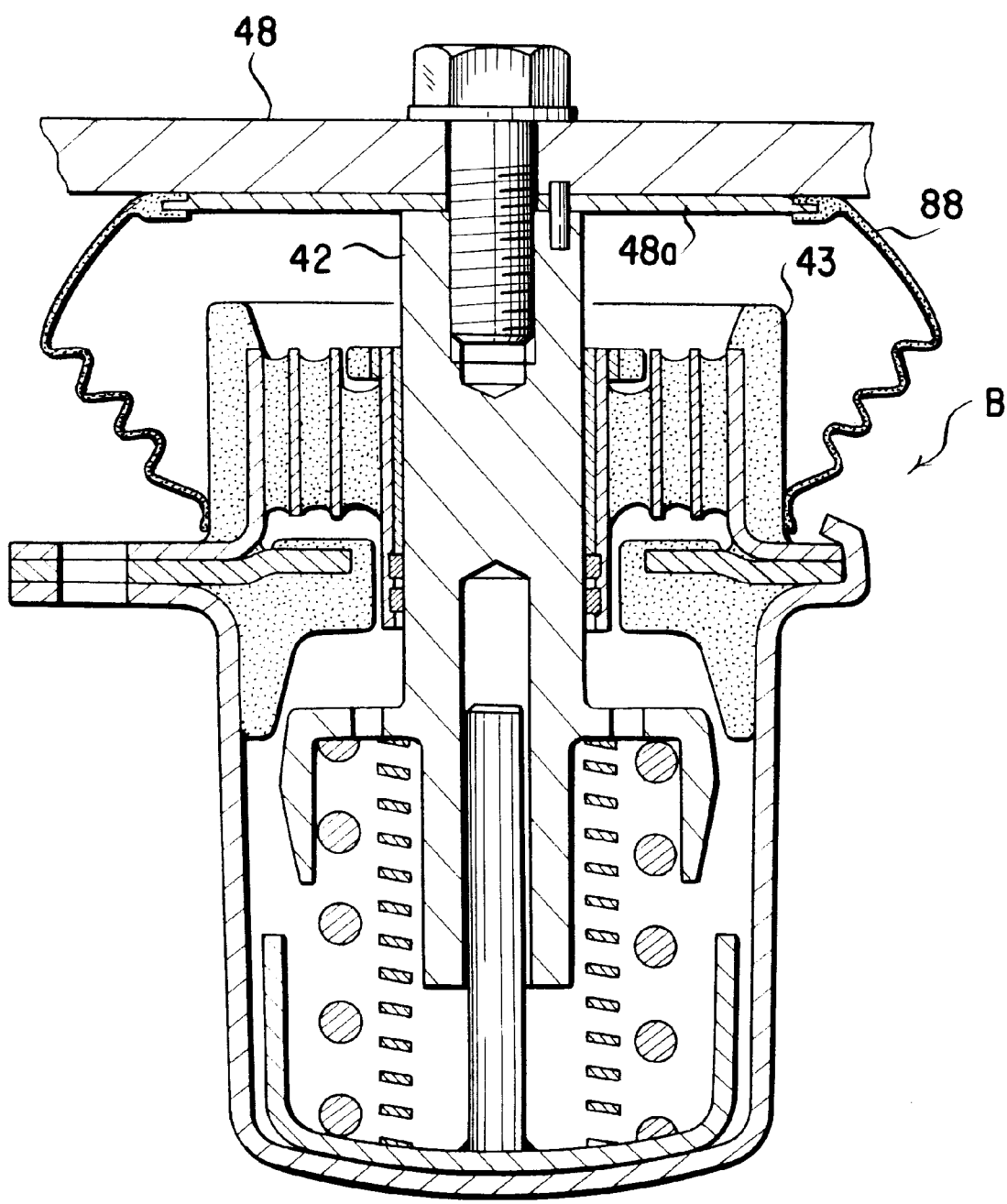
FIG. 11 is a cross sectional view showing a further and third example of a shielding member for covering the upper part of a cylindrical rubber mount in the above mentioned second embodiment of the present invention.

In the second example shown in FIG. 11, a bellows rubber member 88 is attached at its lower end to a lower peripheral surface of the said cylindrical rubber mount 43 and its upper end to the edge of a circular plate member 48a that is sandwiched between the top end of the said guide shaft 42 and the said attachment bracket 48 as with the above mentioned cover plate member 85.

Figure 12:
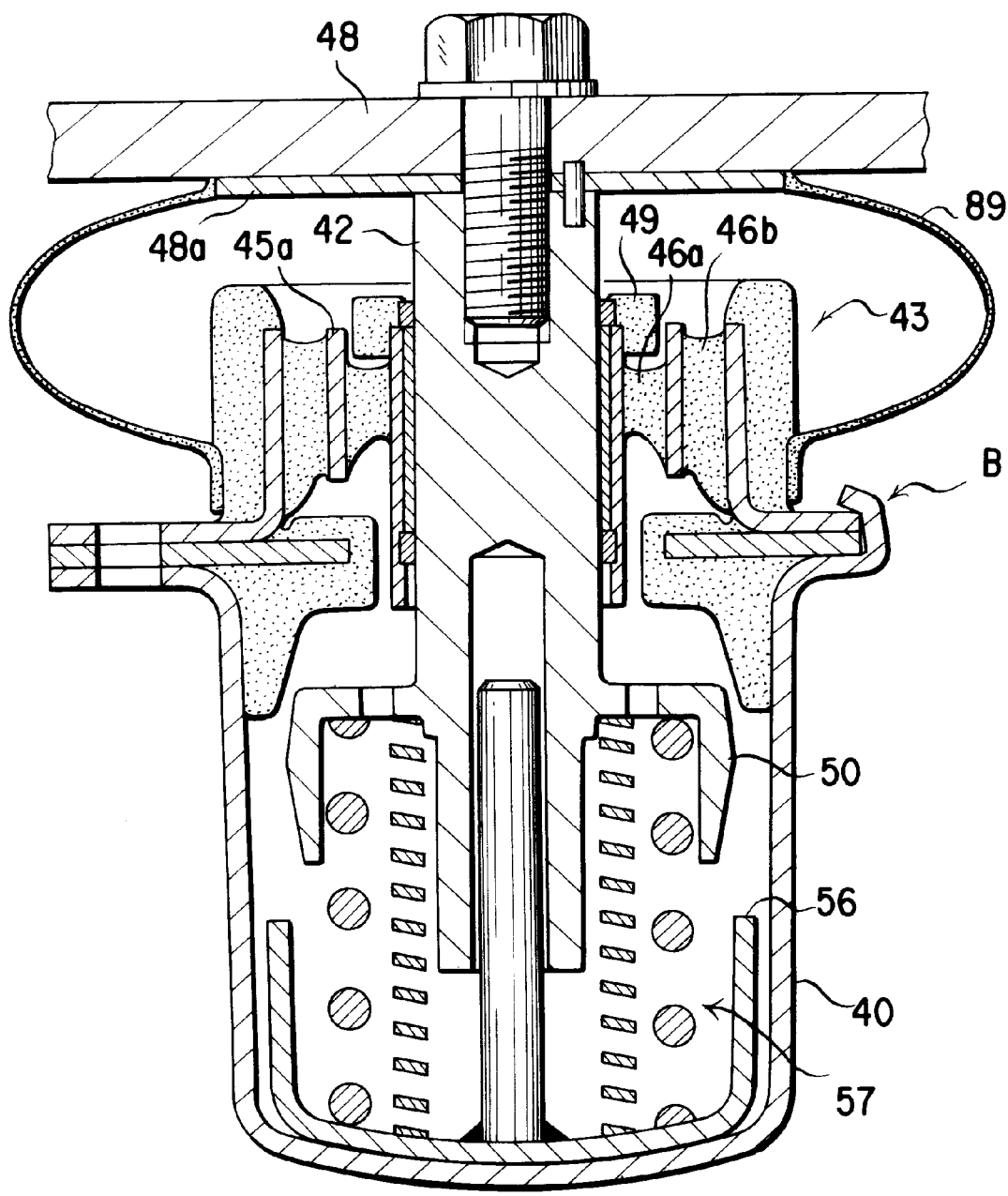
FIG. 12 is a cross sectional view showing a fourth example of a shielding member for covering the upper part of a cylindrical rubber mount in the above mentioned second embodiment of the present invention.

Further, as shown in FIG. 12, a flexure shield rubber member 89 may be used to bridge across the said plate member 48a and the hem portion of the said cylindrical rubber mount 43 for covering the latter as a whole.

By adopting any of these constructions, the entire upper portion of the said rubber mount 43 and its sliding portion are effectively shielded from the outside to prevent any foreign matter such as dust, earth and sand, water or the like from being intruded into these portions.

The coil springs constituting the said spring member 57 in the above mentioned second embodiment are also used in a third embodiment of the present invention described later and hence an explanation of its operation is omitted here and will be given later in a description of the third embodiment which follows.

Now, an explanation will be given of the third embodiment of a liquid sealed suspension unit according to the present invention with reference to FIG. 13.

In the present embodiment, a said vessel 40 has at its upper a said flange portion 41 and, as a whole, is cup shaped with its inner bottom surface being spherical. An axial upper side of the said guide shaft 42 whose lower end meets with the inside of the said vessel 40 and which is coaxially arranged with the latter is fitted with the said cylindrical rubber mount 43 so as to be slidable relative thereto.

The said cylindrical rubber mount 43 is composed of a plurality of cylindrical rubber layers 46a, 46b, 46c and 46d laminated coaxially and circularly via a plurality of cylindrical members 45a, 45b and 45c so that the said rubber layers may be thinned progressively from their inside towards their outside. In this connection it should be noted that the rubber layer 46d which is located at the outermost side, for the purpose of acquiring a predetermined strength, is made thicker than the other rubber layers 46a, 46b and 46c. Of the above above mentioned cylindrical members 45a, 45b and 45c, the one that is located at the their innermost side is made higher than the others, thus extending upwards so that when the said guide shaft 42 is moved downwards more than a predetermined distance, the lower surface of the said bracket 48 that is fastened to the said guide shaft 42 may contact with the upper end of the said cylindrical member 45a and the latter may thus serve as a stopper. Also, to the upper end portion of the said sleeve 44 there is fastened the said roll preventing stopper 49 made from a rubber and that is variably spaceable from, and can make a roll preventing contact with, the inner surface of the said upwards extending cylindrical member 45a.

A said cylindrical damper plate member 50 is disposed in an area in which the lower end portion of the said guide shaft 42 meets with the inside of a said liquid sealed chamber 80. And, the said damper plate member 50 is formed around its axis with a bore 51 extending axially and there is formed around the said bore 51 an annular recess which serves to receive the said spring member 57, thus constituting a spring reception portion 52. Also, the said damper plate member 50 has its peripheral surface that is formed at its lower side with a said downwards tapered surface 53 progressively reduced in diameter downwards and at its upper side with a said upwards tapered surface 54 progressively reduced in diameter upwards.

A damper receiving member 55, that is cup shaped, is disposed on a bottom surface of the said vessel 40 and has at its central portion a guide rod 56 projecting upwards therefrom, that is adapted to be slidably fitted in the above mentioned guide bore 51 coaxially therewith. And, the said guide rod 56 has a diameter that is smaller than by a small length S such that when the said guide bore 51 is axially displaced relative to to the said guide rod 56, the said damping liquid 60 can be freely passed into and out of the said guide bore 51 through an interstice that is defined by the length S. Between the said damper receiving member 55 and the said damper plate member 50 there is interposed the said spring member 57, which is here comprised of a pair of coil springs 58a and 58b having different spring constants.

The lower surface of the said damper receiving member 55 has a spherical surface that is substantially the same as the spherical surface of the inner bottom surface of the said vessel 40 so that it may be slidable transversely to the vertical axis. Also, the upper portion of the said damper receiving member 55 has an inner surface that is substantially in parallel with and opposing to the downwards tapered surface 53 of the said damper plate member 50 across a predetermined spacing.

On the other hand, a said rubber stopper 59, which is provided with a said tapered recess 59a, is disposed below a said base plate 47 of the above mentioned rubber mount 43 so that when the said damper plate member 50 is moved upwards more than a predetermined distance, the said upwards tapered surface 54 may contact with an inner surface of the said recess 59a and may thus no longer be moved upwards.

In the construction mentioned above, the said mounted body will be supported on the said frame side via the said liquid sealed suspension unit C.

And, if the said mounted member is then stationary, its weight is acting as an initial load on the said liquid sealed suspension unit C. This state is the state shown in FIG. 13. The vertical load that then develops will be supported only by that 58a of the said coil springs which has a larger spring constant of the said spring member 57.

When the said mounted member is vertically vibrated, the said guide shaft 42 will be axially vibrated. In the state in which it has been displaced from the state in which it received the above mentioned initial load, the vertical load will be resiliently supported by the said pair of coil springs 58a and 58b of the said spring member 57. And, if this vertical vibration is increased or the weight of the said mounted member is enlarged so that the said guide shaft 42 may be moved downwards against the said spring member 57 from the state shown in FIG. 13, the lower surface of the said attachment bracket 48, as shown in FIG. 14A, will come to contact with the upper surface of the said cylindrical member 45a inside of the said rubber mount 43 and thereafter the vertical load will be supported by the said spring member 57 as well as a stress that is created by the deformation in the shearing direction of the said rubber mount 43. Then, the load will be resiliently supported by the laminated rubber layers of the said rubber mount 43 and the said pair of coil springs 58a and 58b.

And, when a maximum load is acting downwards, the lower surface of the said attachment bracket 48 will contact with the upper surface of the said rubber layer 46d that is located at the outermost side of the said rubber mount 43 and the said rubber layer 46d will serve as a stopper, thereby bringing about a stroke end.

Since the laminated rubber layers of the above mentioned rubber mount 43 become structurally softer as they go inside thereof, the spring characteristic of the said rubber mount 43 will be the characteristic that it becomes more rigid (the spring constant increased) as the vibration amplitude is increased.

Figure 14A:
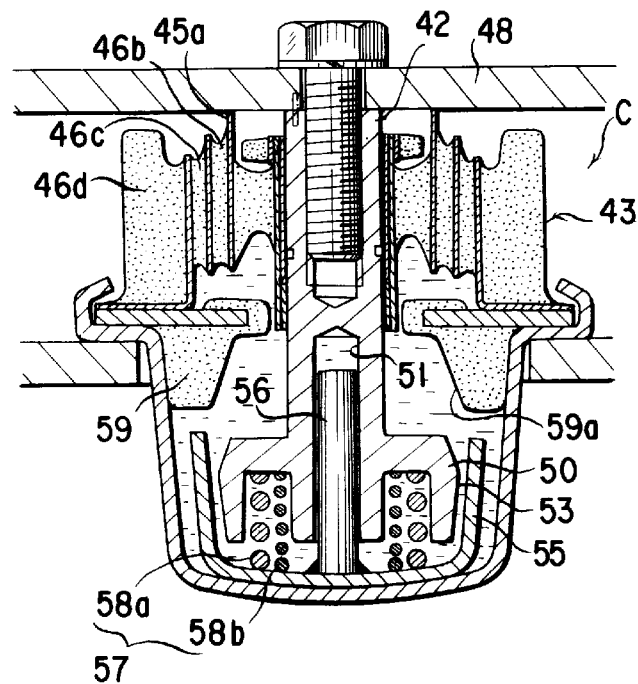
FIGS. 14A and 14B are each a cross sectional view showing the state in which an axial load is acting in the above mentioned third embodiment of the present invention.
Figure 14B:
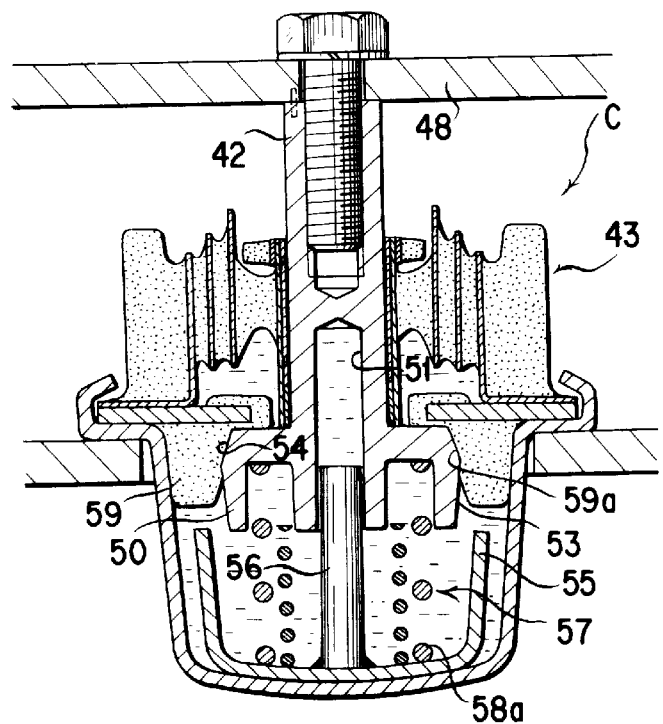

Also, according to the construction mentioned above, in a state in which there is no load, as shown in FIG. 14B the said guide shaft 42 will be thrusted upwards by one spring coil 58a so that the upward tapered surface 54 of the said damper plate member 50 may contact with the inner surface of the said recess 59a, thus bringing about a stroke end.

Also, as shown in FIGS. 14A and 14B, in the vibratory operation of the above mentioned liquid sealed suspension unit C, it can be seen that, with the said guide shaft 42 moved up and down the said damper plate member 50 is moved up and down in the said damper receiving member 55, the said damping liquid 60 within the said damper receiving member 55 will be displaced through the gap between the downwards tapered surface 53 of the said damper plate member 50 and the inner surface of the said damper receiving member 55 and, as a consequence, a damping force will be created by the fluid resistance that is then produced.

Also, when the above mentioned operation is effected, a similar damping force will be created between the upwards tapered surface 54 of the said damping plate member 50 and the inner surface of the recess 59a of the said rubber stopper 59.

Figure 19:
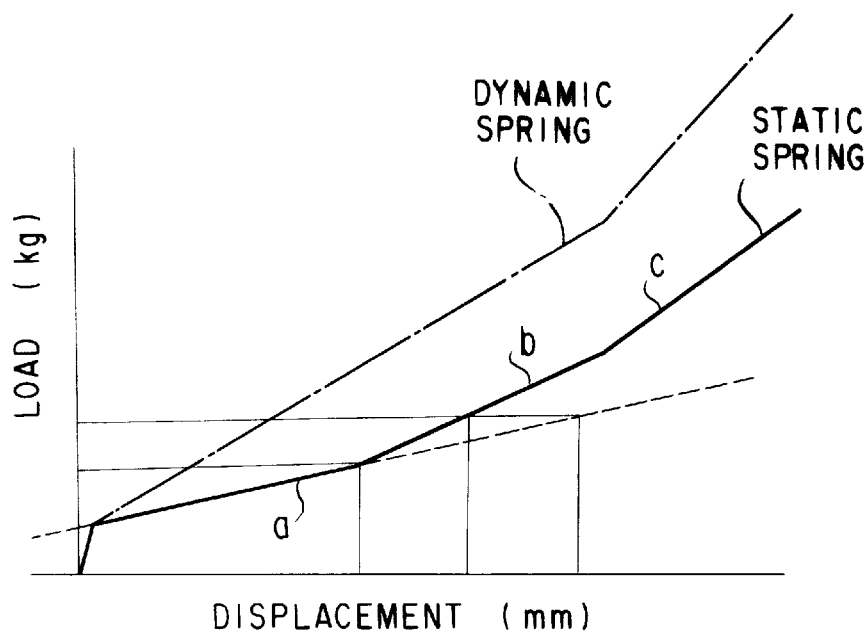
FIG. 19 is a graph showing the spring properties when an axial damper is operated in the above mentioned third embodiment of the present invention.

FIG. 19 is a graph showing the relationship of the displacement of the said damping plate member 50 with respect to the load that is effective during the up and down damping action thereof mentioned above. In the graph, the solid line represents a static spring characteristic due to the elastic deflections of the the said spring member 57 and the said rubber mount 43 whereas the one dot chain line represents a dynamic spring characteristic due to the above mentioned elastic deflections to which the damping characteristic by the said damping liquid 60 is added. In this connection it should be noted that the said damping characteristic due to the said damping liquid 60 became effective if the rate of operation of the said damper plate member 50 was 0.2 m/sec.

In the said static spring characteristic curve shown in FIG. 19, the characters a, b and c correspond to the supporting state by the said coil spring 58 alone, the supporting state by both the said springs 58a and 58b and the state in which an elastic support by the said rubber mount 43 is added when the upper end of the said innermost cylindrical member 45a makes a contact with the said attachment bracket 48, respectively.

And, in the above mentioned elastic support state by the rubber mount 43, it is seen that the state c changes to provide the dynamic spring characteristic curve when the vibration produced damping characteristic is added to that of the said damper plate member 50 itself.

In this way, in the upward and downward movements of the said guide shaft 42, it can be seen that when it is moved downwards (in the retracted part of a vibration), the load will be supported by the said pair of coil springs 58a and 58b; and, when it is further moved downwards, the load will be supported by the said pair of coil springs 58a and 58b as well as by the said laminated rubber layers 46a, 46b, 46c and 46d of the rubber mount 43 when the said cylindrical member 45a thereof makes a contact with the said attachment bracket 48. Then, as mentioned previously, the damping action by the said damping liquid 60, that is produced by the vibrations, will be added. It should also be noted here that with the laminated rubber layers 46a, 46b and 46c being structurally softer as they go inside, the spring characteristic will then be the characteristic that the rigidity is increased (the spring constant increased) as the distance of displacement of the said guide shaft 42 is increased.

On the other hand, when the said guide shaft 42 is moved upwards (in the extended part of a vibration), it can be seen that while the spring characteristic will be softer (the spring constant reduced) as the distance of displacement of the said guide shaft 42 is increased, the said damper plate member 50 acting as a liquid stopper will cause the damping effect to be increased as the said distance of displacement is increased. Accordingly, because of the fact the force of resistance is progressively increased as the said distance of displacement increases, a damping characteristic of the vibrations will result without such an impact as accompanied by a bottom striking feeling.

Next, an explanation will be given with respect to the case in which a transverse force is acting on the said guide shaft 42.

Firstly, for a small vibration amplitude in this case, a favorable vibration absorbing characteristic will be obtained by a soft rubber function that is developed by the innermost rubber layer 46a of the said rubber mount 43.

Figure 15A:
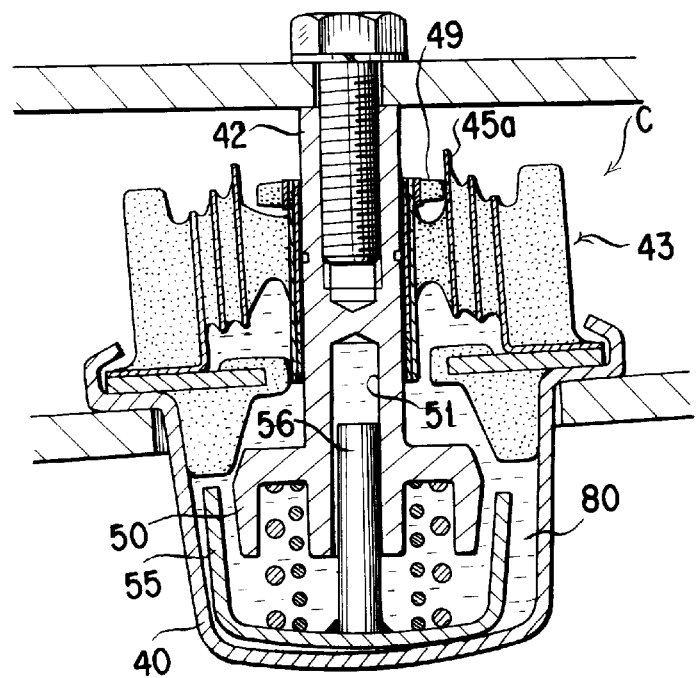
FIGS. 15A and 15B are each an explanatory view showing an operation in which a transverse load is acting in the above mentioned third embodiment of the present invention.
Figure 15B:
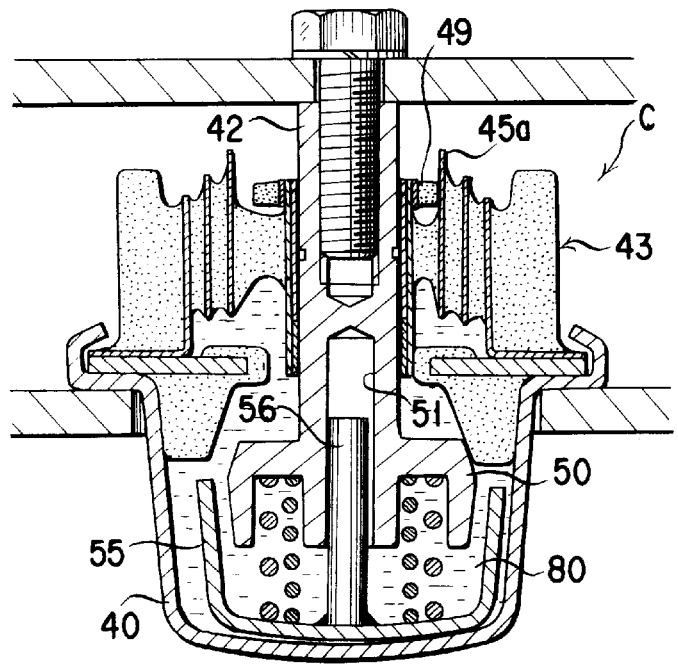

On the other hand, if a large rolling is produced, as shown in FIGS. 15A and 15B, the said guide shaft 42 will be largely inclined (FIG. 15A) or will be displaced in parallel transversely (FIG. 15B). Then, the said roll preventing stopper 49 will make a contact with the said cylindrical member 45a to resiliently support the said drive shaft 42 in the rolling direction. Also, the said guide bore 51 and the said guide rod 56 will then be fitted with each other to allow the said guide shaft 42 to be displaced and at the same time to permit the damper receiving member 55 to be displaced while being rubbed with the inner bottom surface of the said vessel 40. The rolling force will then be damped by the sliding frictional force which then develops. Also, then, because while the said guide shaft is being displaced, the said damper receiving member 55 is displaced via the said plate member 50 and the said guide rod 56 transversely while thrusting aside the said damping liquid 60 inside of the said vessel 40, the rolling force will be damped also by the fluid resistance that is then developed.

Figure 13:
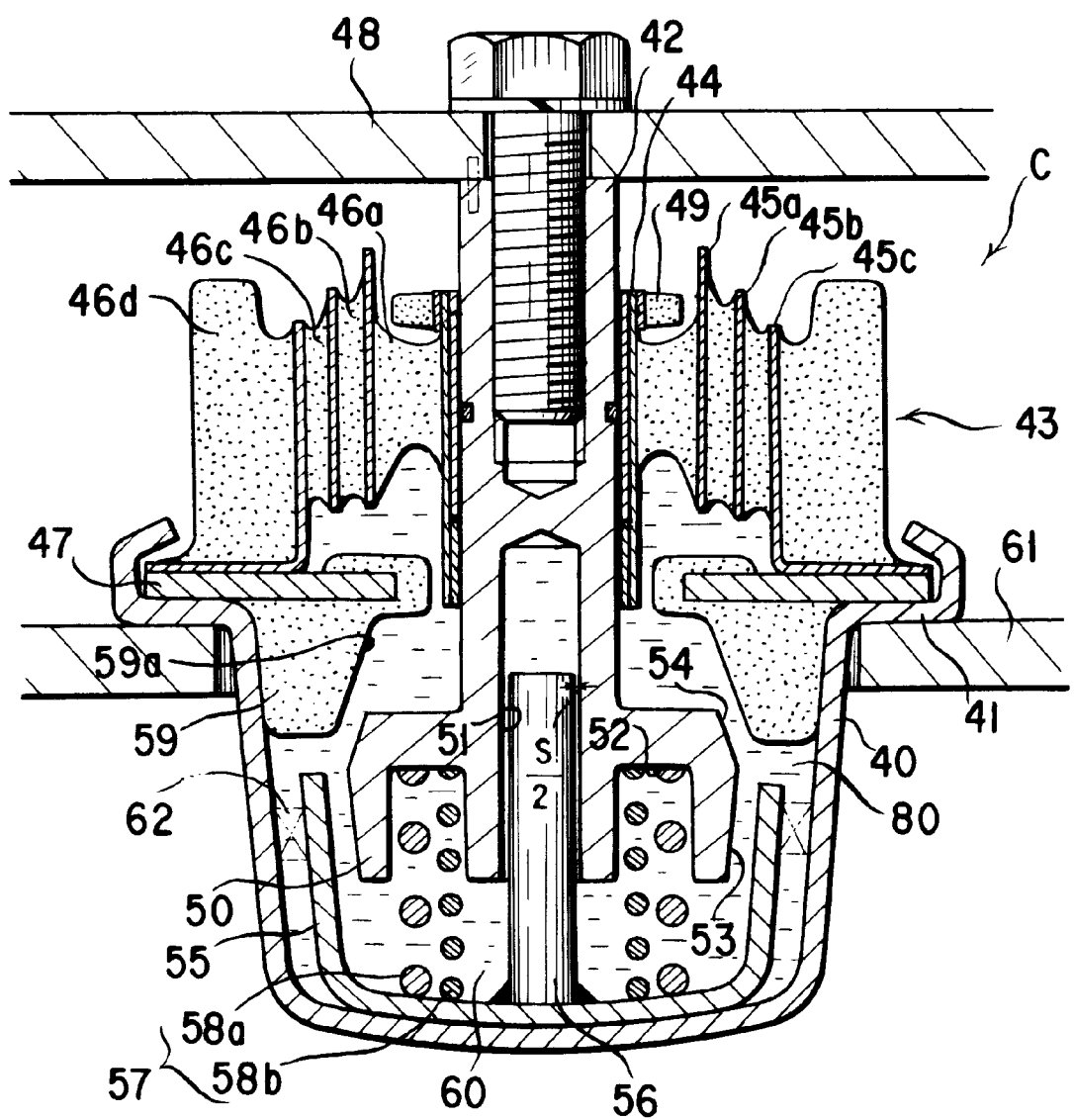
FIG. 13 is a cross sectional view of a third embodiment of the liquid sealed suspension unit according to the present invention.

In connection with the above, it should be noted in this construction, an elastic material 62 having a high flexibility may be disposed in the gap between the said damper receiving member 55 and the said vessel 40, as shown by the two dot chain line in FIG. 13.

Figure 20:
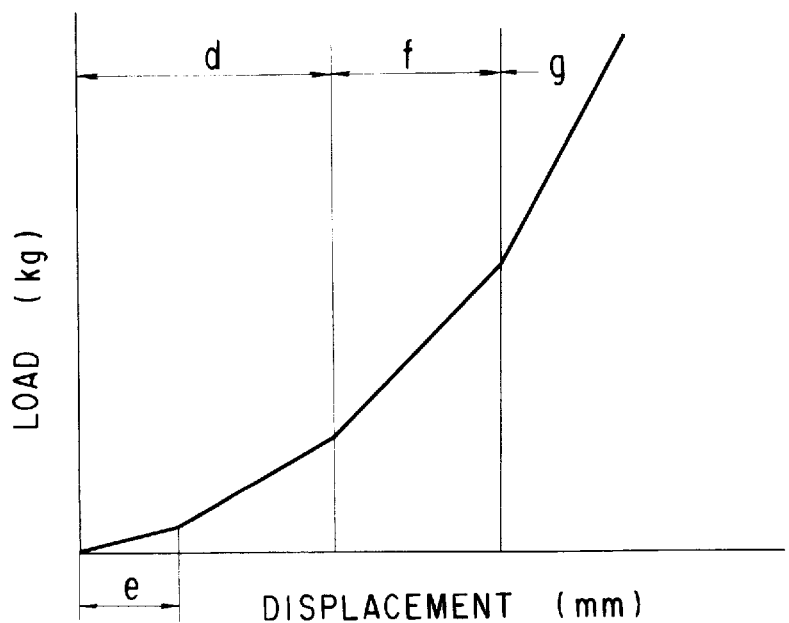
FIG. 20 is a graph showing the spring property when a transverse damper is operated in the above mentioned third embodiment of the present invention.

FIG. 20 shows the relationship (transverse spring characteristic) of the transverse displacement of the above mentioned guide shaft 42 with respect to the weight of the said rubber mount 43 in a case where a transverse force is acting on the said guide shaft 42.

As the said guide shaft 42 is displaced transversely the said innermost rubber layer 46a, that is the softest, will first be deformed mainly in the direction of its thickness to exhibit the spring characteristic d. Then, the range e represents a range before the said roll preventing stopper 49 comes in contact with the said cylindrical member 45a. As will be apparent from the spring characteristic d, with the said roll preventing stopper 49 coming into contact with the said cylindrical member 45a, the transverse load will be supported by both the said stopper 49 and the said rubber layer 46a. Then, the spring characteristic is a rigidity reduced a little (the spring constant increased).

Next, mainly the intermediate rubber layer 46b following the said innermost rubber layer 46a will be deformed to exhibit the spring characteristic f and then the outermost rubber layer 46c will mainly be deformed to exhibit the spring characteristic g.

In this case, the said laminated rubber layers 46a, 46b and 46c will become softer as they go inside and will become more rigid as they go outside so that the spring characteristic f, g of each range may be varied linearly.

Figure 16:
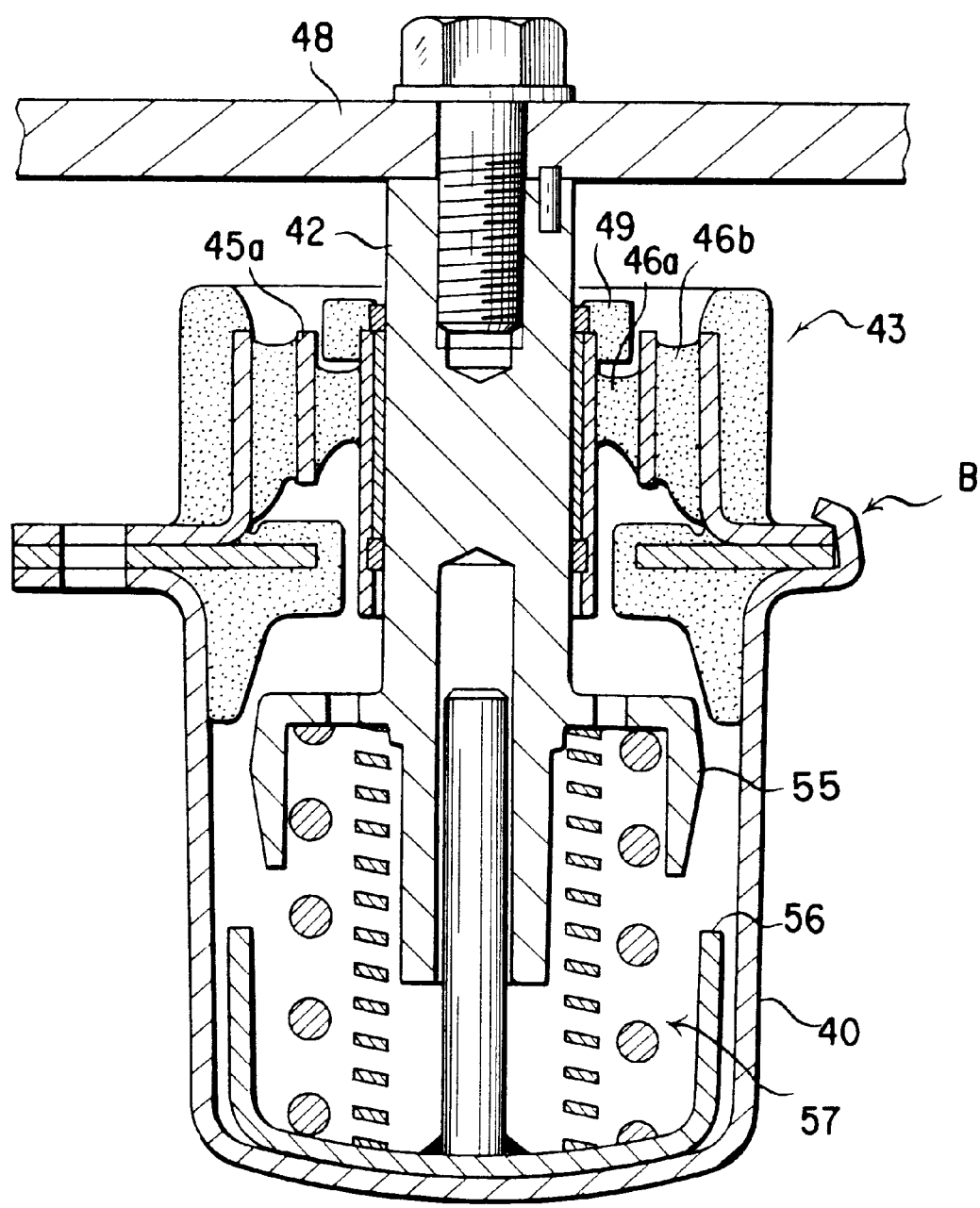
FIG. 16 is a cross sectional view showing another example of laminated cylindrical rubber layers constituting a cylindrical rubber mount in the above mentioned third embodiment of the present invention.

In contrast to the above, as shown in FIG. 16 (FIG. 12), by configuring the said laminated rubber layers 46a and 46b in cross section so that their respective outer axial height may be greater than their inner axial height to provide a substantially truncated conical cross section as well, the transverse spring characteristic of the said rubber mount 43 can be rendered gradually more rigid with respect to its transverse deformation. In this connection it should be noted that in this case as well the said inner rubber layer 46a is made softer than the said outer rubber layer 46b.

Figure 9:
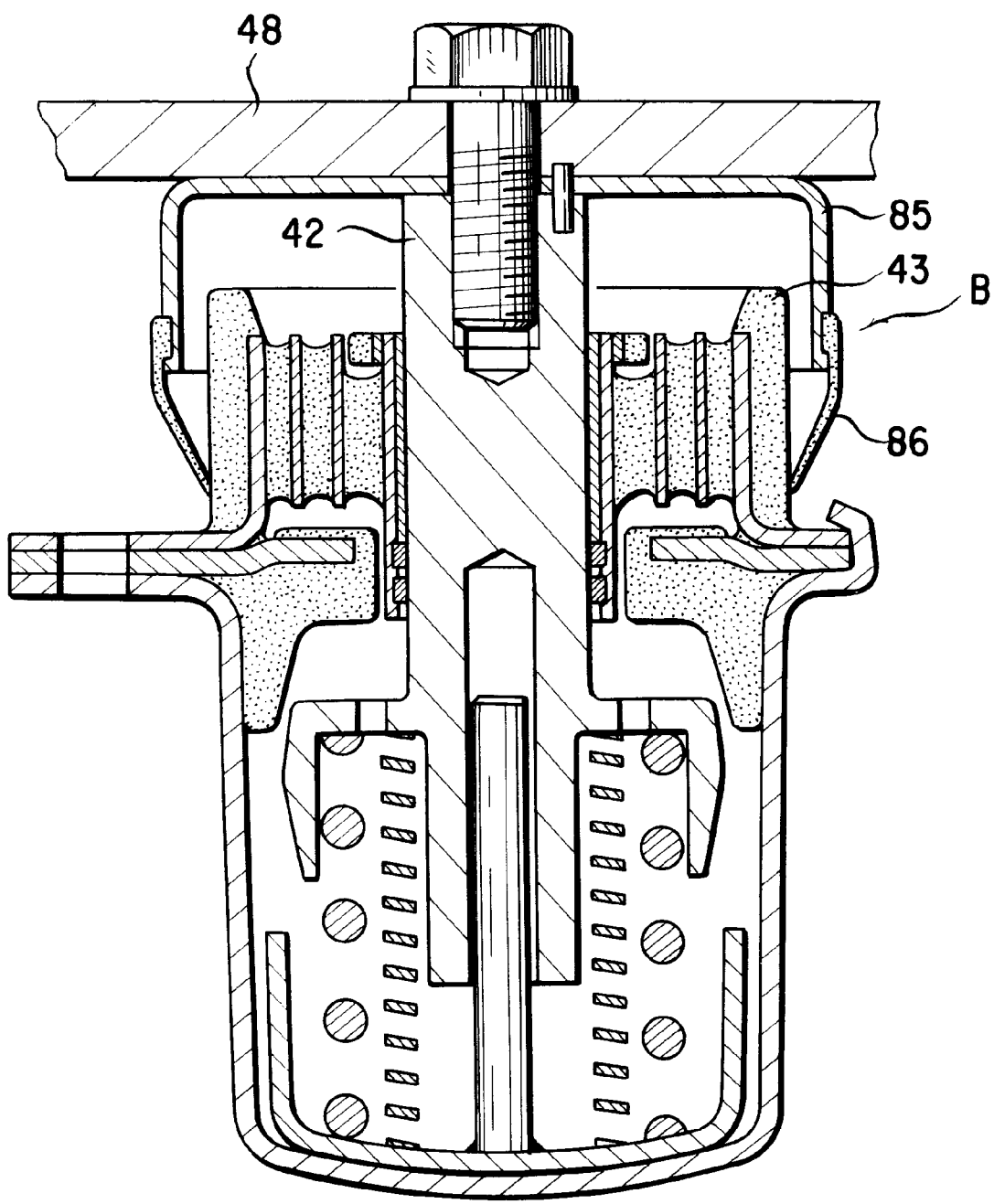
FIG. 9 is a cross sectional view showing a first example of a shielding member for covering the upper part of a cylindrical rubber mount in the above mentioned second embodiment of the present invention.
Figure 21:
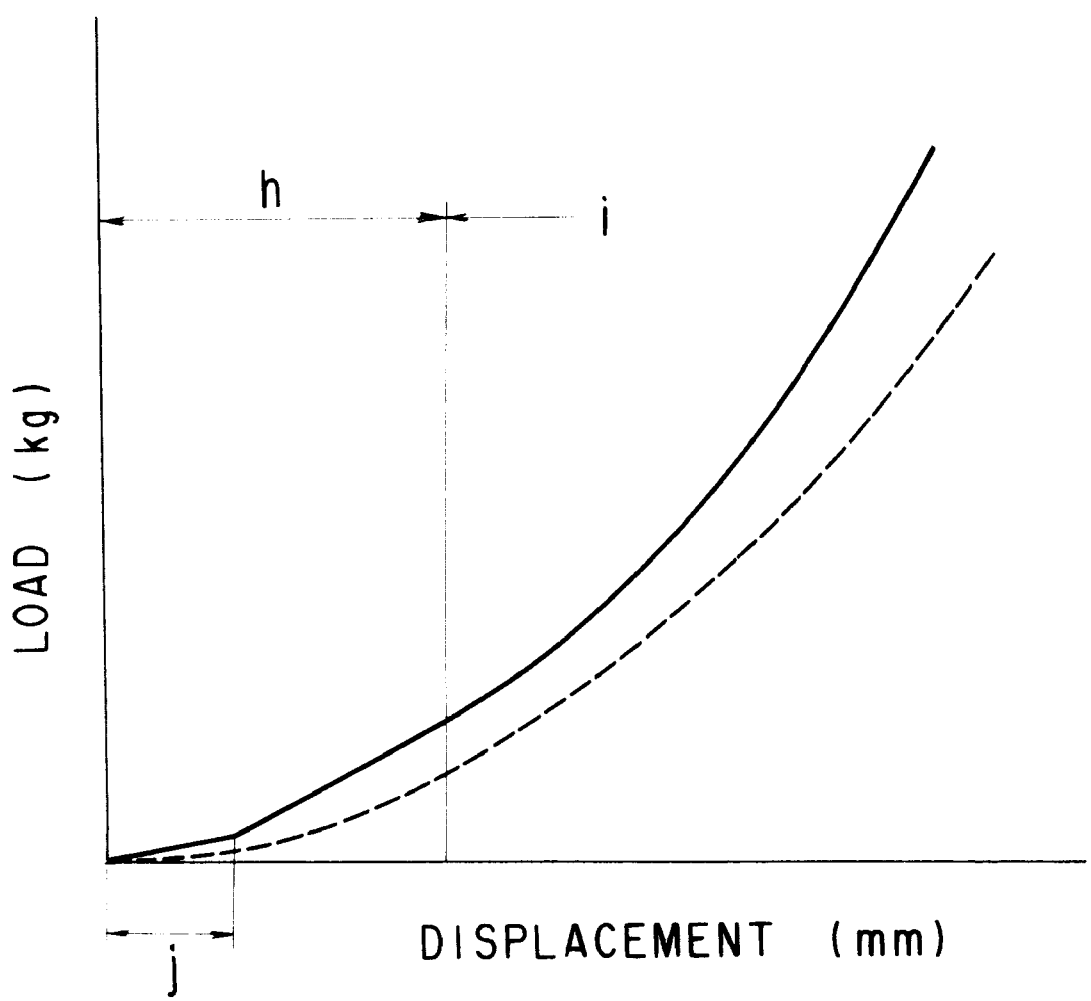
FIG. 21 is a graph showing the spring property when a transverse damper in an example shown in FIGS. 12 and 16 is operated.

The transverse spring characteristic in this case is shown in FIG. 21. More specifically, the character h in FIG. 21 represents the spring characteristic in the state in which the said innermost rubber layer 46 is mainly deformed and the character i therein represents the spring characteristic in the state in which the said outer rubber layer 46b is mainly deformed. And, the dotted line in the Figure represents the case in which the cross sectional configuration of the both rubber layers 46a and 46b is of a substantially trapezoidal cross section as shown in FIG. 16, and is a smooth curve. Also, the solid line in the Figure represents the case in which the cross section of the innermost rubber layer 46a has its inner side axial length and its outer side axial length which are substantially identical to each other as shown in FIGS. 5 and 9 whereas the cross section of the outer rubber layer 46b is a substantially trapezoid as shown in FIG. 16 and in which the spring characteristic h is varied linearly whereas the spring characteristic i is a smooth curve. In the Figure, the range j corresponds to the state before the said roll preventing stopper 49 comes in contact with the said cylindrical member 45a.

The guide bore 51 of the said damper plate member 50 and the guide rod of the said damper receiving member 55 are fitted with each other with a gap formed between them, as mentioned previously. Thus, the gap of a spacing S/2 in the diametric direction is formed at a portion where the said guide bore 51 and the said guide rod 56 are fitted with each other. When the said damper plate member 50 is axially vibrated, the said damping liquid 60 introduced into the said guide bore 51 can be freely passed out of and into it through the said gap. Accordingly, with the said damping liquid sealed between the said guide hole 51 and the said guide rod 56, there will be nothing to prevent the required damping characteristic.

Also, according to this construction, it can be seen that if a transverse force is acting on the said damper plate member 50 to vibrate the said guide shaft transversely the vibrations with an amplitude that is lower than a backlash between the said guide 51 and the said guide rod 56 will be absorbed by the said rubber mount alone since the said damper receiving member 55 is not displaced transversely. And, if vibrations are produced with an amplitude that exceeds the above mentioned backlash, the said damper receiving member 55 will be displaced transversely. Since an abutting frictional force is then produced between the said damper receiving member 55 and the inner bottom surface of the said vessel 40 and serves as a frictional damping force, an enlarged damping force will be generated.

It can thus be seen that this allows a vehicle to be comfortable to ride in even as in a case where it is traveling on such as a graveled road for the purpose of leveling the ground to produce high frequency vibration with a small transverse amplitude.

Figure 17A:
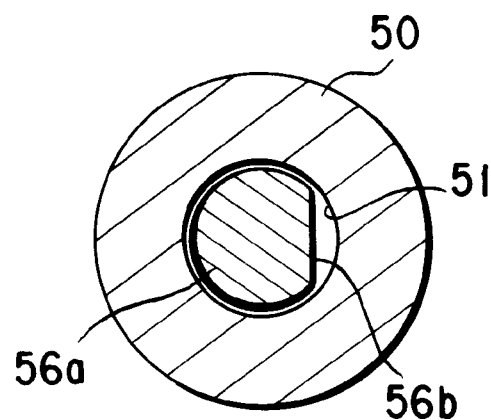
FIGS. 17A and 17B are each a cross sectional view showing a different example of the guide rod relative to a guide bore in the above mentioned third embodiment of the present invention.
Figure 17B:
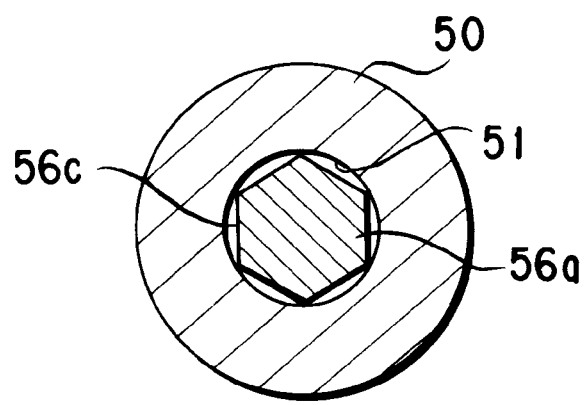

FIGS. 17A and 17B show other examples which are different as to the configuration in which the guide bore of the said damper plate member 50 and the guide rod of the said damper reception member 55 are fitted with each other. What is shown in FIG. 17 has a construction in which a guide rod 56a which is substantially circular in cross section but of which a portion on its outer surface is chamfered is fitted in the said guide bore 51 that is circular in cross section, with a small interstice between them and with a gap 56b that is arcuate in cross section, which serves to prevent the said damping liquid 60 from being sealed in the space in the said guide bore 51.

What is shown in FIG. 17B has a configuration in which a guide rod that is hexagonal in cross section is fitted in the said guide bore that is circular in cross section, with six minute interstices and with six small gaps 56c each of which is arcuate in cross section and which serve to prevent the said damping liquid 60 from being sealed in the space in the said guide bore 51.

According to these constructions, it can be seen that when a force is acting transversely on the said damper plate member 50, the said damper plate member 50 and the said damper receiving member 55 will be vibrated integrally in a transverse direction. This will give rise to a good response, thus allowing a vehicle to be comfortable to ride in where it is traveling on a not so much heavily bad road (such as an irregular or wavy road).

In the above mentioned third embodiment of the present invention, it should also be noted that in a case where a frictional resistance of the said damper receiving member 55 for the inner bottom surface of the vessel is not expected as a vibration damping force, the said damper receiving member 55 may be securely fixed to the vessel 40 by welding or the like. In this case, it is necessary to enlarge the gap between the said guide rod 56 and the said guide bore 51.

Also, a soft, elastic material may be interposed between each spring coil 58a, 58b of the said spring member 57 and the damper plate member 50.

Further, while in each of the above mentioned embodiments the damper receiving member is provided, it should also be noted that the same may be omitted and the said spring member 57 may be adapted to make a direct contact with the inner bottom surface of the said vessel 40. In this case, it can be seen that there is no damping effect due to the frictional resistance between the said damper receiving member 55 and the inner bottom surface of the said vessel 40.

Also, it should be noted in each of the above mentioned embodiments of the present invention, the laminated rubber layers 46a, 46b, 46c and 46d of the said rubber mount 43 were composed of chloroprene rubber having a hardness range between HS 50° and 65° so that they may be progressively lowered in hardness from the outside to the inside. Also, the said damping liquid 60 was composed of a silicone oil having a viscosity of 5 to 100000 cst and the said coil spring 58a, 58b was composed of a stainless spring steel having a spring constant of 5 to 50 kg.f/mm. And, the above mentioned damping liquid 60 had added thereto a lubricating agent such as nylon (trade name), polyacetal or polystyrene.

Figure 18A:
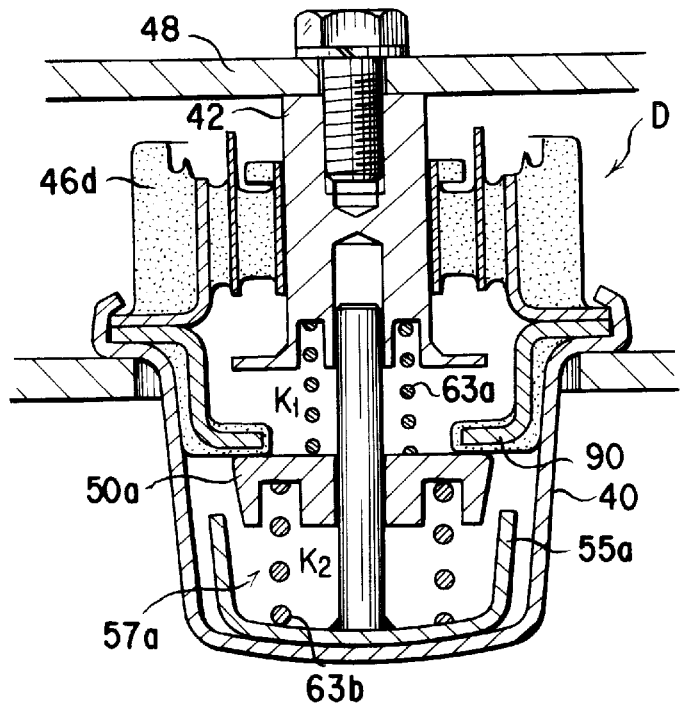
FIGS. 18A and 18B are cross sectional views of a forth and a fifth embodiment, respectively, of the liquid sealed suspension unit according to the present invention.
Figure 18B:
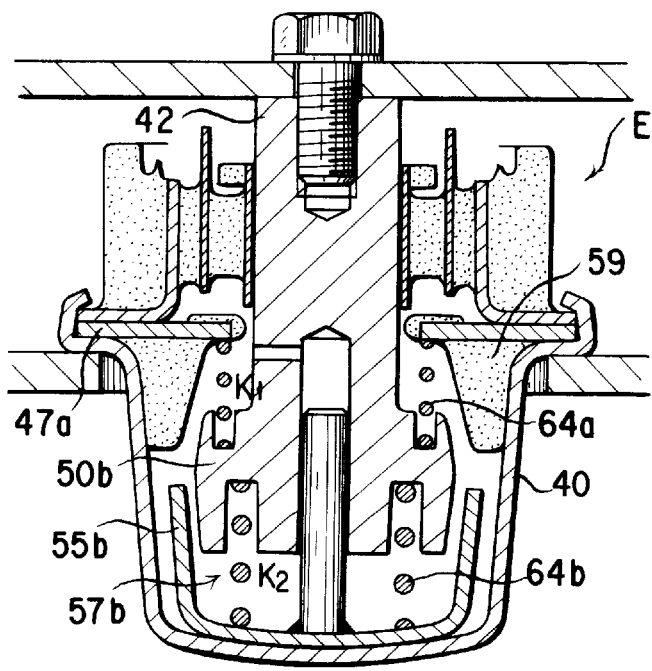

FIGS. 18A and 18B show, respectively, liquid sealed suspension units D and E constituting a fourth and a fifth embodiment of the present invention. The liquid sealed suspension unit D shown in FIG. 18A and constituting the fourth embodiment of the present embodiment makes use of a pair of coil springs 63a and 63b which constitute a said spring member 57, which are arranged vertically in series as divided and which have an identical direction of expansion and contraction. The said coil springs 63a and 63b are interposed between a said guide shaft 42 and a said damper plate member 50a and between the said damper plate member 50a and a damper receiving member 55a, respectively.

And, the said vessel 40 has fastened thereto a stopper 90 for regulating the displacement of the said damper plate member 50a towards the side of the said guide shaft 42.

In this case, the lower coil spring 63b has a spring constant $k_2$ that is greater than a spring constant $k_1$ of the upper coil spring 63a. By preliminarily applying an initial load to the said lower coil spring 63b, a spring force having the upper spring constant $k_1$ is effective up to a certain preset load and when the said preset load is exceeded, a spring force having a spring constant k that is expressed by $k=1/(1/k_1+1/k_2)$ will become effective.

The liquid sealed suspension unit E shown in FIG. 18B constituting the fifth embodiment of the present embodiment makes use of a pair of coil springs 64a and 64b which constitute a said spring member 57, which are arranged vertically in series as divided and which have opposite directions of expansion and contraction. The said coil springs 64a and 64b are interposed between the upper side of a said damper plate member 50b and a said base plate 47a and between the lower side of the said damper plate member 50b and a damper receiving member 55b, respectively.

In the case of this example, in the state in which the downward displacement of the said guide is short and the said upper coil spring 64a is effective, the said lower coil spring 64b will be effective as well, a spring force that is then effective having a spring constant: $k=k_1+k_2$. In the state, however, in which the said upper coil spring 64a is left from the said base plate 47a and then fully expanded, a spring force that is then effective will have a spring constant which is equal to the spring constant $k_2$ of the said lower spring 64b.

Figure 22:
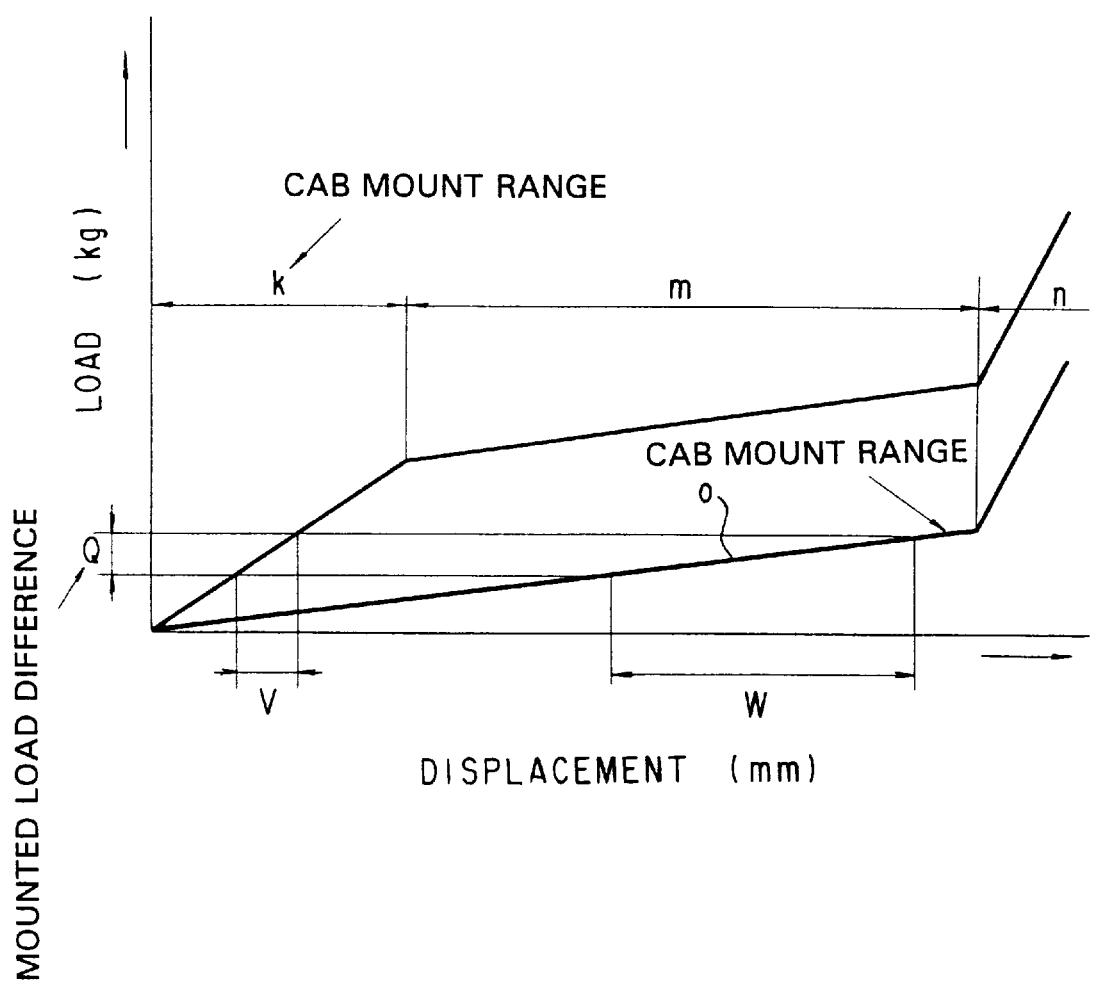
FIG. 22 is a graph showing the spring property in the above mentioned fourth embodiment of the present invention.
Figure 23:
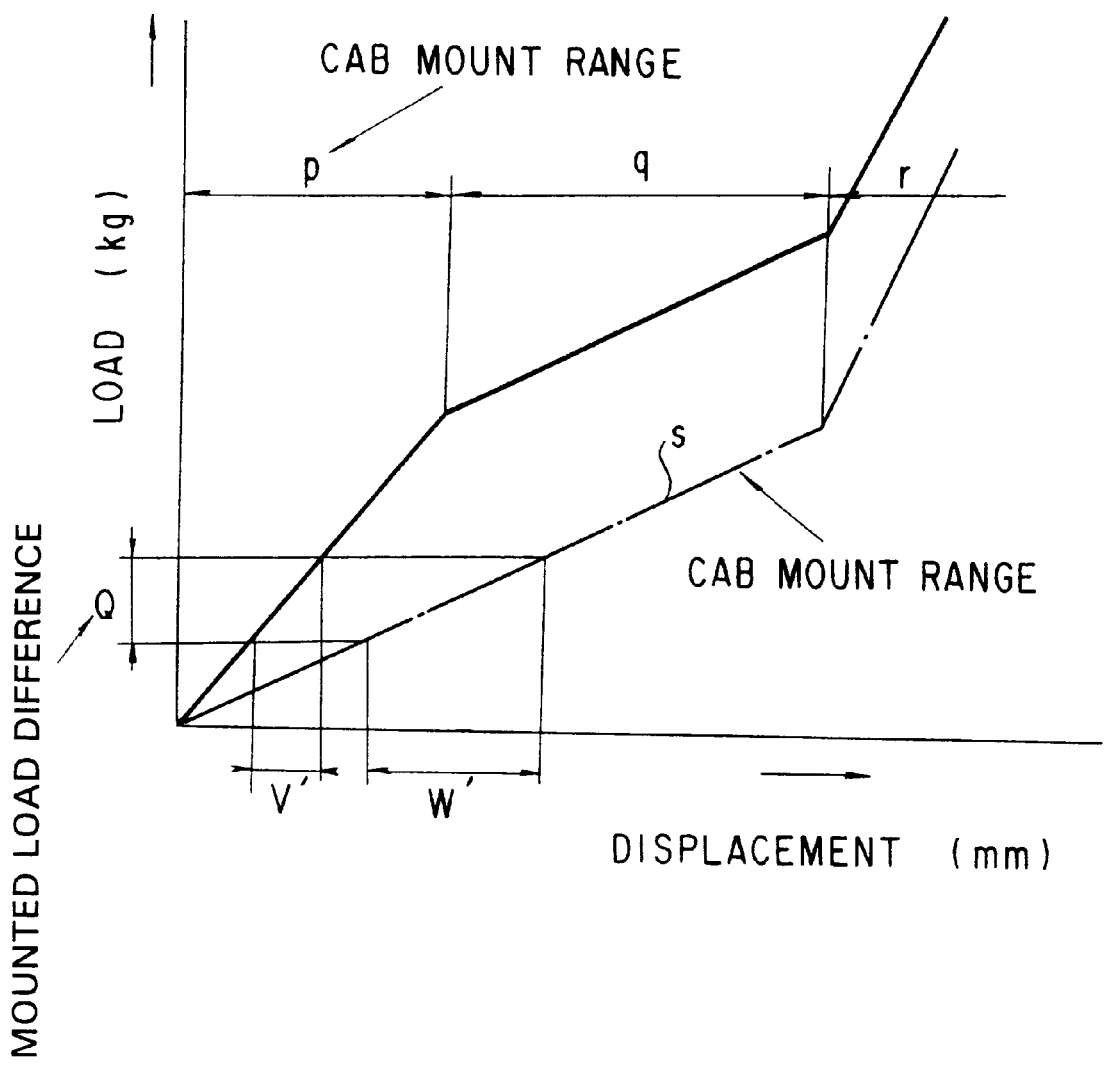
FIG. 23 is a graph showing the spring property in the above mentioned fifth embodiment of the present invention.

FIGS. 22 and 23 show each a relationship between a displacement and a load that is effective to the spring member 58a, 58b when each of the above mentioned fourth and fifth embodiments of the present invention is adopted, respectively.

FIG. 22 applies to the fourth embodiment shown in FIG. 18A. In the Figure, the character k represents the spring characteristic in the state in which only a spring force having the upper spring constant k1 is effective. Then, the said damper plate member 50a is held in contact with the said stopper 90 at the side of the said vessel 40 by an attachment load of the said lower side spring 63a. The character m represents the spring characteristic in the state when a spring force having the spring constant: $k=1/(1/k_1+1/k_2)$ by the said upper side spring 63a and the said lower side spring 63b. The character n represents the spring characteristic in the state after the said attachment bracket 48 has made a contact with the upper surface of the rubber layer 46d (i. e. the rubber stopper) located at the outermost side of the said rubber mount 43.

This will render the spring characteristic in the load range of the cab mounted region (k) rigid and the spring characteristic in a load range of the vibration absorbing region (m) that exceeds the said load range soft. Thus, since there will, in the load range of the cab mounted region (k), be developed no increase in the amount of displacement by varied mounted loads produced when the spring characteristic is softened in order to improve the vibration absorptivity, it will be possible to reduce a variation in the said amount of displacement with a plurality of such liquid sealed suspension units in the said load range.

This can be explained in some more detail below.

Figure 5:
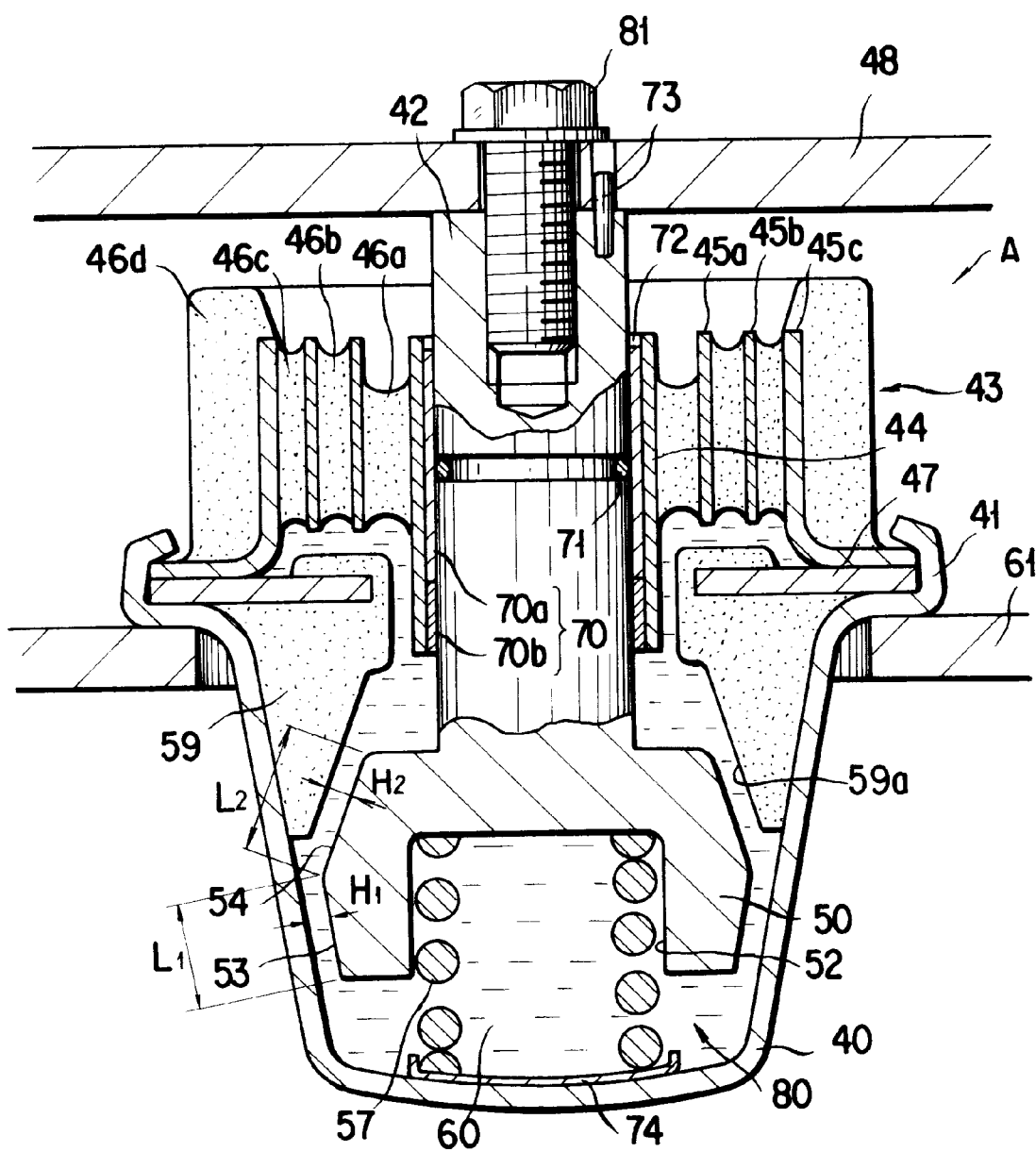
FIG. 5 is a cross sectional view of a first embodiment of the liquid sealed suspension unit according to the present invention.

The relationship between a displacement and a load corresponding to a target range of the cab mounted state when the said single coil spring 57 is used as in the first embodiment of the present invention shown in FIG. 5 is represented by the line o in FIG. 22. And, while the spring characteristic with which the vibration absorbing region (m) may be set is required in order to improve the vibration absorptivity, in the case of a similar spring characteristic shown by the line o, if there is a difference Q in the mounted load, it is seen that the amount of displacement due to that will be increased to W and a variation in the said amount of displacement with a plurality of liquid sealed suspension units will then be increased. Thus, when the cab is supported with a plurality of liquid sealed suspension units, there will develop a tendency for the cab not to be mounted horizontally. Also, for this reason, when a given cab is exchanged with another cab having a different weight, an extreme vertical difference between them can take place so that the cab may even interfere with some other equipment.

However, since the forth embodiment shown in FIG. 18A enables the range k shown in FIG. 22 to be set as the target range of the cab mounted state, it also enables the amount of displacement V for the same mounted load difference Q to be limited as small. This, in turn, enables a variation in the said amount of displacement with a plurality of liquid sealed suspension units to be small. Thus, when a cab is supported with a plurality of liquid sealed suspension units, it can be made possible to support the cab with no inclination thereof whatsoever. Also, for the same reason, if a given cab is exchanged with another cab having a different weight, their vertical difference can be limited to be so small that it may no longer interfere with any other equipment.

FIG. 23 applies to the fifth embodiment shown in FIG. 18B, where the character p represents the spring characteristic in the sate in which both the said upper coil spring 64a having the spring constant $k_1$ and the said lower coil spring 64b having the spring constant $k_2$, that is, the state in which the spring constant: $k=(k_1+k_2)$ is effective. The character q represents the spring characteristic in the state in which the said upper coil spring 64a has departed from the said base plate 47a and only the said lower spring 64b is effective, that is, the state in which the spring force having the spring constant $k_2$ is effective. And, the character r represents the spring characteristic in the state after the said attachment bracket 48 has made a contact with the said rubber stopper 46d.

According to this construction, a similar operation and effect can be obtained to those in the fourth embodiment shown in FIG. 18A.

More specifically, the amount of displacement W' for the mounted load difference Q in an example using the single coil spring and shown by the character s can be limited to the amount of displacement V'.

It should be noted at this point that compared with the spring characteristic shown in FIG. 22 and corresponding to the fourth embodiment, the spring characteristic shown in FIG. 23 and corresponding to the fifth embodiment has an amount of displacement due to the mounted load difference reduced.

Also, with respect to the above mentioned liquid sealed suspension units C, D and E which represent the third, fourth and fifth embodiments, respectively, it should be noted that the liquid sealed suspension unit C using the parallel type spring 57 is desirably used in supporting a cab of which the mounted load is small or which may not be exchanged with another cab having a different weight, when mounted at a plurality of sites. This type of the liquid sealed suspension unit C has a spring member hardened stepwise and thus is free from a feeling of discomfort such a bottom striking feeling. Also, it eliminates the need for an externally equipped stopper and hence is simple in construction.

On the other hand, the liquid sealed suspension units D and E shown in FIGS. 18A and 18B, respectively, in which a pair of coil springs are disposed vertically up and down are each desirably used in suspending cabs of different mounted loads whose difference is large.

And, the liquid sealed suspension unit D is desirably used in suspending a cab whose mounted load is light or a cab on a vehicle traveling for leveling the ground (or traveling on the graveled road) to produce a small vibration amplitude, and may be provided with a damper plate member in the form of a flange at the lower end of the said guide shaft 42a corresponding to the spring constant of the coil springs, Thus, it provides a damping action that is well balanced with the damping action by the spring member and that is finely adjusted for desired damped results.

Also, the liquid sealed suspension unit E is desirably used in suspending a cab whose mounted load is heavy or a cab on a vehicle designed for a bad road to produce large vibration amplitude. Although its damping action by the damper plate member cannot be set to vary largely compared with the liquid sealed suspension unit D, it has the advantage that its transverse damping effect is high.

While the present invention has hereinbefore been described with respect to certain illustrative embodiments thereof, it will readily be appreciated by a person skilled in the art to be obvious that many alterations thereof, omissions therefrom and additions thereto can be made without departing from the essence and the scope of the present invention. Accordingly, it should be understood that the present invention is not limited to the specific embodiments thereof set out above, but includes all possible embodiments thereof that can be made within the scope with respect to the features specifically set forth in the appended claims and encompasses all equivalents thereof.

What is claimed is:

1. A liquid sealed suspension unit comprising:
   a first member;
   a second member adapted to be fixed to a frame, said first and second members being independent of each other;
   a cylindrical rubber mount which couples together said first and second members such that said cylindrical rubber mount is secured to said first member and said second member is mounted so as to be slidable in an axial direction thereof relative to said cylindrical rubber mount, said cylindrical rubber mount including a plurality of cylindrical rubber layers laminated via a plurality of cylindrical members, with said cylindrical rubber layers having at least one of:
   different thicknesses in a radial direction thereof, and different heights in an axial direction thereof;
   a vessel secured to said first member and including a liquid sealed chamber;
   a damping liquid sealed in said liquid sealed chamber;
   a damper plate member provided at one end of said second member and positioned within said liquid sealed chamber; and
   a spring member, including at least one spring coil, interposed between said damper plate member and an inner bottom surface of said vessel.

2. A liquid sealed suspension unit, as set forth in claim 1, wherein the cylindrical rubber layers of said cylindrical rubber mount are different in hardness in said radial direction.

3. A liquid sealed suspension unit, as set forth in claim 2, wherein said cylindrical rubber layers of said cylindrical rubber mount have cross sectional configurations in which an outer one of said cylindrical rubber layers is higher than an inner one of said cylindrical rubber layers in said axial direction.

4. A liquid sealed suspension unit, as set forth in claim 2, further comprising:
   a sleeve which retains a bearing that is fitted so as to be axially slidable relative to said second member and to which said cylindrical rubber mount is fastened; and
   a roll preventing stopper mounted to an outside of said sleeve so that said roll preventing stopper may be brought into a loosely fitting state with an inner circumferential surface of an inner one of said cylindrical members that opposes said sleeve, with an inner one of said cylindrical rubber layers positioned between said sleeve and said inner one of said cylindrical members.

5. A liquid sealed suspension unit, as set forth in claim 2, further comprising a stopper member disposed above said vessel; and wherein said damping plate member has a peripheral surface which is formed with a downward tapered surface and an upward tapered surface; said downward tapered surface opposing an inner surface of said vessel; and said upward tapered surface opposing an inner surface of said stopper member.

6. A liquid sealed suspension unit, as set forth in claim 2, wherein said spring member comprises a plurality of coil springs.

7. A liquid sealed suspension unit, as set forth in claim 1, wherein said cylindrical rubber layers of said cylindrical rubber mount have cross sectional configurations in which an outer one of said cylindrical rubber layers is higher than an inner one of said cylindrical rubber layers in said axial direction.

8. A liquid sealed suspension unit, as set forth in claim 7, further comprising:

a sleeve which retains a bearing that is fitted so as to be axially slidable relative to said second member and to which said cylindrical rubber mount is fastened; and a roll preventing stopper mounted to an outside of said sleeve so that said roll preventing stopper may be brought into a loosely fitting state with an inner circumferential surface of an inner one of said cylindrical members that opposes said sleeve, with an inner one of said cylindrical rubber layers positioned between said sleeve and said inner one of said cylindrical members.

9. A liquid sealed suspension unit, as set forth in claim 7, further comprising a stopper member disposed above said vessel; and wherein said damping plate member has a peripheral surface which is formed with a downward tapered surface and an upward tapered surface; said downward tapered surface opposing an inner surface of said vessel; and said upward tapered surface opposing an inner surface of said stopper member.

10. A liquid sealed suspension unit, as set forth in claim 7, wherein said spring member comprises a plurality of coil springs.

11. A liquid sealed suspension unit, as set forth in claim 7, wherein said damping liquid comprises a silicone oil having incorporated therein an additive agent with a lubricity, and wherein said additive agent is selected from the group consisting of NYLON (trade name), polyacetal and polystyrene.

12. A liquid sealed suspension unit, as set forth in claim 1, further comprising:

a sleeve which retains a bearing that is fitted so as to be axially slidable relative to said second member and to which said cylindrical rubber mount is fastened; and a roll preventing stopper mounted to an outside of said sleeve so that said roll preventing stopper may be brought into a loosely fitting state with an inner circumferential surface of an inner one of said cylindrical members that opposes said sleeve, with an inner one of said cylindrical rubber layers positioned between said sleeve and said inner one of said cylindrical members.

13. A liquid sealed suspension unit, as set forth in claim 1, further comprising a stopper member disposed above said vessel; and wherein said damping plate member has a peripheral surface which is formed with a downward tapered surface and an upward tapered surface; said downward tapered surface opposing an inner surface of said vessel; and said upward tapered surface opposing an inner surface of said stopper member.

14. A liquid sealed suspension unit, as set forth in claim 1, wherein said spring member comprises a plurality of coil springs.

15. A liquid sealed suspension unit, as set forth in claim 1, wherein said damping liquid comprises a silicone oil having incorporated therein an additive agent with a lubricity, and wherein said additive agent is selected from the group consisting of NYLON (trade name), polyacetal and polystyrene.

16. A liquid sealed suspension unit, as set forth in claim 2, wherein said damping liquid comprises a silicone oil having incorporated therein an additive agent with a lubricity, and wherein said additive agent is selected from the group consisting of NYLON (trade name), polyacetal and polystyrene.

17. A liquid sealed suspension unit, as set forth in claim 1, further comprising:

a damper receiving member positioned in said liquid sealed chamber so as to be slidable along an inner bottom surface of said vessel, said damper receiving member and said damper plate member being fitted with each other so that said damper plate member is movable in an axial direction relative to said damper receiving member; and wherein said damper receiving member is interposed between said spring member and said inner bottom surface of said vessel.

18. A liquid sealed suspension unit, as set forth in claim 17, wherein one of said damper plate member and said damper receiving member is formed with a guide bore, and the other of said damper plate member and said damper receiving member is provided with a guide rod which is slidably fitted in said guide bore with a diametrical interstice between them such that said damping liquid may freely pass therethrough.

19. A liquid sealed suspension unit, as set forth in claim 17, wherein:

one of said damper plate member and said damper receiving member is formed with a guide bore whereas the other of said damper plate member and said damper receiving member is provided with a guide rod which is slidably fitted without backlash in said guide bore; and one of said guide bore and guide rod has a cross sectional configuration which is different from that of the other of them so that an interstice is formed between the inner surface of said guide bore and an outer surface of said guide rod such that said damping liquid may freely pass therethrough.

20. A liquid sealed suspension unit, as set forth in claim 17, further comprising a stopper member disposed above said vessel; and wherein said damping plate member has a peripheral surface which is formed with a downward tapered surface and an upward tapered surface; said downward tapered surface opposing an inner surface of said vessel; and said upward tapered surface opposing an inner surface of said stopper member.

21. A liquid sealed suspension unit, as set forth in claim 17, wherein said spring member comprises a plurality of coil springs.

22. A liquid sealed suspension unit comprising:

a first member;

a second member adapted to be fixed to a frame, said first and second members being independent of each other;

a cylindrical rubber mount which couples together said first and second members such that said cylindrical rubber mount is secured to said first member and said second member is mounted so as to be slidable in an axial direction thereof relative to said cylindrical rubber mount, said cylindrical rubber mount including a plurality of cylindrical rubber layers laminated via a plurality of cylindrical members, with said cylindrical rubber layers having at least one of:

different thicknesses in a radial direction thereof, and different heights in an axial direction thereof;

a vessel secured to said first member and including a liquid sealed chamber;

a damping liquid sealed in said liquid sealed chamber;

a damper plate member provided at one end of said second member and positioned within said liquid sealed chamber; and a spring member, including at least one spring coil, interposed between said damper plate member and an inner bottom surface of said vessel;

wherein said cylindrical rubber layers of said cylindrical rubber mount have cross sectional configurations in which an outer one of said cylindrical rubber layers is higher than an inner one of said cylindrical rubber layers in said axial direction.

23. A liquid sealed suspension unit, as set forth in claim 22, further comprising:

a sleeve which retains a bearing that is fitted so as to be axially slidable relative to said second member and to which said cylindrical rubber mount is fastened; and a roll preventing stopper mounted to an outside of said sleeve so that said roll preventing stopper may be brought into a loosely fitting state with an inner circumferential surface of an inner one of said cylindrical members that opposes said sleeve, with an inner one of said cylindrical rubber layers positioned between said sleeve and said inner one of said cylindrical members.

24. A liquid sealed suspension unit, as set forth in claim 22 further comprising a stopper member disposed above said vessel; and wherein said damping plate member has a peripheral surface which is formed with a downward tapered surface and an upward tapered surface; said downward tapered surface opposing an inner surface of said vessel; and said upward tapered surface opposing an inner surface of said stopper member.

25. A liquid sealed suspension unit, as set forth in claim 22, wherein said spring member comprises a plurality of coil springs.

26. A liquid sealed suspension unit, as set forth in claim 22, wherein said damping liquid comprises a silicone oil having incorporated therein an additive agent with a lubricity, and wherein said additive agent is selected from the group consisting of NYLON (trade name), polyacetal and polystyrene.

27. A liquid sealed suspension unit comprising:

a first member;

a second member adapted to be fixed to a frame, said first and second members being independent of each other;

a cylindrical rubber mount which couples together said first and second members such that said cylindrical rubber mount is secured to said first member and said second member is mounted so as to be slidable in an axial direction thereof relative to said cylindrical rubber mount, said cylindrical rubber mount including a plurality of cylindrical rubber layers laminated via a plurality of cylindrical members, with said cylindrical rubber layers having at least one of:

different thicknesses in a radial direction thereof, and different heights in an axial direction thereof;

a vessel secured to said first member and including a liquid sealed chamber;

a damping liquid sealed in said liquid sealed chamber;

a damper plate member provided at one end of said second member and positioned within said liquid sealed chamber; and a spring member, including at least one spring coil, interposed between said damper plate member and an inner bottom surface of said vessel;

wherein the cylindrical rubber layers of said cylindrical rubber mount are different in hardness in said radial direction; and wherein said cylindrical rubber layers of said cylindrical rubber mount have cross sectional configurations in which an outer one of said cylindrical rubber layers is higher than an inner one of said cylindrical rubber layers in said axial direction.

28. A liquid sealed suspension unit comprising:

a first member;

a second member adapted to be fixed to a frame, said first and second members being independent of each other;

a cylindrical rubber mount which couples together said first and second members such that said cylindrical rubber mount is secured to said first member and said second member is mounted so as to be slidable in an axial direction thereof relative to said cylindrical rubber mount, said cylindrical rubber mount including a plurality of cylindrical rubber layers laminated via a plurality of cylindrical members, with said cylindrical rubber layers having at least one of:

different thicknesses in a radial direction thereof, and different heights in an axial direction thereof;

a vessel secured to said first member and including a liquid sealed chamber;

a damping liquid sealed in said liquid sealed chamber;

a damper plate member provided at one end of said second member and positioned within said liquid sealed chamber;

a spring member, including at least one spring coil, interposed between said damper plate member and an inner bottom surface of said vessel;

a sleeve which retains a bearing that is fitted so as to be axially slidable relative to said second member and to which said cylindrical rubber mount is fastened; and a roll preventing stopper mounted to an outside of said sleeve so that said roll preventing stopper may be brought into a loosely fitting state with an inner circumferential surface of an inner one of said cylindrical members that opposes said sleeve, with an inner one of said cylindrical rubber layers positioned between said sleeve and said one of said inner cylindrical members.

29. A liquid sealed suspension unit comprising:

a first member;

a second member adapted to be fixed to a frame, said first and second members being independent of each other;

a cylindrical rubber mount which couples together said first and second members such that said cylindrical rubber mount is secured to said first member and said second member is mounted so as to be slidable in an axial direction thereof relative to said cylindrical rubber mount, said cylindrical rubber mount including a plurality of cylindrical rubber layers laminated via a plurality of cylindrical members, with said cylindrical rubber layers having at least one of:
different thicknesses in a radial direction thereof, and different heights in an axial direction thereof;
a vessel secured to said first member and including a liquid sealed chamber;
a damping liquid sealed in said liquid sealed chamber;
a damper plate member provided at one end of said second member and positioned within said liquid sealed chamber;
a spring member, including at least one spring coil, interposed between said damper plate member and an inner bottom surface of said vessel;
a sleeve which retains a bearing that is fitted so as to be axially slidable relative to said second member and to which said cylindrical rubber mount is fastened; and
a roll preventing stopper mounted to an outside of said sleeve so that said roll preventing stopper may be brought into a loosely fitting state with an inner circumferential surface of an inner one of said cylindrical members that opposes said sleeve, with an inner one of said cylindrical rubber layers positioned between said sleeve and said inner one of said cylindrical members;
wherein the cylindrical rubber layers of said cylindrical rubber mount are different in hardness in said radial direction.

30. A liquid sealed suspension unit comprising:
a first member;
a second member adapted to be fixed to a frame, said first and second members being independent of each other;
a cylindrical rubber mount which couples together said first and second members such that said cylindrical rubber mount is secured to said first member and said second member is mounted so as to be slidable in an axial direction thereof relative to said cylindrical rubber mount, said cylindrical rubber mount including a plurality of cylindrical rubber layers laminated via a plurality of cylindrical members, with said cylindrical rubber layers having at least one of:
different thicknesses in a radial direction thereof, and different heights in an axial direction thereof;
a vessel secured to said first member and including a liquid sealed chamber;
a damping liquid sealed in said liquid sealed chamber;
a damper plate member provided at one end of said second member and positioned within said liquid sealed chamber;
a spring member, including at least one spring coil, interposed between said damper plate member and an inner bottom surface of said vessel; and
a stopper member disposed above said vessel;
wherein said damping plate member has a peripheral surface which is formed with a downward tapered surface and an upward tapered surface; said downward tapered surface opposing an inner surface of said vessel; and said upward tapered surface opposing an inner surface of said stopper member.

31. A liquid sealed suspension unit comprising:
a first member;
a second member adapted to be fixed to a frame, said first and second members being independent of each other;
a cylindrical rubber mount which couples together said first and second members such that said cylindrical rubber mount is secured to said first member and said second member is mounted so as to be slidable in an axial direction thereof relative to said cylindrical rubber mount, said cylindrical rubber mount including a plurality of cylindrical rubber layers laminated via a plurality of cylindrical members, with said cylindrical rubber layers having at least one of:
different thicknesses in a radial direction thereof, and different heights in an axial direction thereof;
a vessel secured to said first member and including a liquid sealed chamber;
a damping liquid sealed in said liquid sealed chamber;
a damper plate member provided at one end of said second member and positioned within said liquid sealed chamber;
a spring member, including at least one spring coil, interposed between said damper plate member and an inner bottom surface of said vessel; and
a stopper member disposed above said vessel;
wherein said damping plate member has a peripheral surface which is formed with a downward tapered surface and an upward tapered surface; said downward tapered surface opposing an inner surface of said vessel; and said upward tapered surface opposing an inner surface of said stopper member; and
wherein the cylindrical rubber layers of said cylindrical rubber mount are different in hardness in said radial direction.

* * * * *